(12) United States Patent
Tada et al.

(10) Patent No.: US 7,650,685 B2
(45) Date of Patent: Jan. 26, 2010

(54) METHOD OF MANUFACTURING HEAD SUSPENSION

(75) Inventors: Hajime Tada, Aikoh-gun (JP); Masao Hanya, Aikoh-gun (JP); Kenichi Takikawa, Aikoh-gun (JP); Eiji Watadani, Aikoh-gun (JP)

(73) Assignee: NHK Spring Co., Ltd., Yokohama (JP)

( * ) Notice: Subject to any disclaimer, the term of this patent is extended or adjusted under 35 U.S.C. 154(b) by 336 days.

(21) Appl. No.: 11/429,895

(22) Filed: May 8, 2006

(65) Prior Publication Data

US 2006/0260119 A1    Nov. 23, 2006

(30) Foreign Application Priority Data

May 9, 2005    (JP) ............................. 2005-136550

(51) Int. Cl.
*G11B 5/127* (2006.01)
*H04R 31/00* (2006.01)

(52) U.S. Cl. .............. 29/603.03; 29/603.04; 29/603.06; 29/603.07; 360/265.6; 360/266.1; 360/264.1

(58) Field of Classification Search .............. 29/603.03, 29/603.04, 603.06; 360/265.6, 266.1, 264.1
See application file for complete search history.

(56) References Cited

U.S. PATENT DOCUMENTS

| | | | |
|---|---|---|---|
| 5,027,240 A | 6/1991 | Zarouri et al. | |
| 5,282,103 A | 1/1994 | Hatch et al. | |
| 5,870,252 A * | 2/1999 | Hanrahan | 360/244.8 |
| 6,104,572 A | 8/2000 | Williams et al. | |
| 6,147,839 A | 11/2000 | Girard | |
| 6,154,344 A | 11/2000 | Marek | |
| 6,381,099 B1 | 4/2002 | Mei | |
| 6,392,843 B1 | 5/2002 | Murphy | |
| 6,728,072 B1 * | 4/2004 | Van Sloun et al. | 360/244.6 |
| 6,741,424 B1 | 5/2004 | Danielson et al. | |
| 6,765,759 B2 | 7/2004 | Bhattacharya et al. | |
| 7,099,116 B1 | 8/2006 | Mei | |
| 7,283,332 B2 | 10/2007 | Weber | |
| 2001/0043443 A1 | 11/2001 | Okamoto et al. | |
| 2004/0120076 A1 | 6/2004 | Takagi et al. | |
| 2006/0250725 A1 | 11/2006 | Tada et al. | |
| 2006/0260118 A1 | 11/2006 | Takikawa et al. | |

FOREIGN PATENT DOCUMENTS

| | | |
|---|---|---|
| JP | 9-282624 | 10/1997 |
| JP | 10-031873 | 2/1998 |
| JP | 2004-079153 | 3/2004 |

* cited by examiner

*Primary Examiner*—Paul D Kim
(74) *Attorney, Agent, or Firm*—Jordan and Hamburg LLP

(57) ABSTRACT

A method of manufacturing a head suspension for a hard disk drive includes a rigid part chain product manufacturing step forming a rigid part chain product where rigid parts are provided continuously, a flexure manufacturing step forming the flexure integrated with the resilient part and the reinforcing parts, a base manufacturing step forming the base, a stacking and coupling step stacking and connecting the rigid part chain product, the resilient part chain product, the bases, and the flexures, to form the stacked set, and a cutting step cutting and separating respective head suspensions from a stacked set.

11 Claims, 25 Drawing Sheets

|  | Example 1 | Comparative Example 1 | Comparative Example 2 |
|---|---|---|---|
| B1 [kHz] | 5.99 | 6.08 | 5.61 |
| T1 [kHz] | 9.09 | 9.18 | 7.76 |
| Sway [kHz] | 14.54 | 12.27 | 14.89 |
| STA [deg] | 2.31 *10-5 | 1.53 *10-5 | 3.23 *10-5 |
| Sway Stif. [N/m] | 19920.21 | 14502.67 | 19997.62 |
| G Lift off [G/gf] | 302.38 | 311.86 | 246.19 |

| LB Thickness [um] | 20 | 25 | 30 | 38 | 51 |
|---|---|---|---|---|---|
| B1 [kHz] | 5.27 | 5.53 | 5.74 | 5.99 | 6.16 |
| T1 [kHz] | 7.52 | 7.94 | 8.42 | 9.09 | 9.93 |
| Sway [kHz] | 11.61 | 12.40 | 13.76 | 14.54 | 15.00 |
| STA [deg] | 4.78 *10-5 | 3.88 *10-5 | 3.11 *10-5 | 2.31 *10-5 | 1.67 *10-5 |
| Sway Stif. [N/m] | 11312.98 | 14125.45 | 15838.22 | 19920.21 | 22997.85 |
| G Lift off [G/gf] | 374.66 | 353.03 | 330.59 | 302.38 | 280.44 | t38um to t51um LB is Proper for 2.5" HDD.

METHOD OF MANUFACTURING HEAD SUSPENSION

BACKGROUND OF THE INVENTION

1. Field of the Invention

The present invention relates to a method of manufacturing a head suspension for a hard disk drive incorporated into an information or data processing apparatus such as a computer.

2. Description of the Related Art

For example, there is a conventional head suspension such as shown in FIG. 49. FIG. 49 is a plan view showing a head suspension 101 incorporated into a hard disk drive. The head suspension 101 includes a base 103, a load beam 105, and a flexure 107. The load beam 105 includes a rigid part 109 and a resilient part 111. Rails 113 are formed along the side edges in an across-the-width direction of the rigid part 109 by rising from the rigid part 109.

FIG. 50 is a partly sectioned view partly showing an example of a hard disk drive in which the head suspensions 101 are arranged. As shown in FIG. 50, the hard disk drive has a carriage 115 including arms 117. Each head suspension 101 is attached to the arm 117 of the carriage 115 via the base 103 by swaging or the like.

The carriage 115 is turned around a spindle 121 by a positioning motor 119 such as a voice coil motor or the like. By turning the carriage 115 around the spindle 121, a head 123 of the head suspension 101 is moved to a target track on a disk 125 arranged in the hard disk drive.

When the disk 125 is rotated at high speed, the head 123 slightly floats from the surface of the disk 125 against a gram load that is a load applied to the head 123 by the head suspension 101.

In recent years, application of the hard disk drives increasingly expands to a small-sized personal computer for a mobile machine or a portable (cellular) phone so that the hard disk drives are used under more severe conditions. Importance of measures to shock applied or input to the hard disk drive gradually increases.

The head suspension has a shock property that determines a lift of the slider from the surface of the hard disk when a shock is applied or input. The shock property of the head suspension is dependent on the weight of the load beam.

For example, a first head suspension has a load beam having a thickness (t) of 51 μm, a length (IL) of 7 mm, and a gram load of 2.5 gf that is applied by the load beam to a head, and a second head suspension has a load beam having a thickness (t) of 30 μm, a length (IL) of 5.5 mm, and a gram load of 2.5 gf. If a shock of 1 msec duration (1 msec in half wavelength) is applied to these head suspensions, a slider of the first head suspension lifts at an acceleration of 628 G and a slider of the second head suspension lifts at an acceleration of 1103 G.

It is understood from these examples that, to improve the shock property of a head suspension, a load beam of the head suspension must be thin and short and must have a large gram load.

Therefore, measures such as reduction of the thickness of a load beam are adopted in a head suspension for a miniaturized hard disk drive such as a 2.5-inch hard disk drive whose shock property is required to be improved.

However, a head suspension having a thin load beam sways or flutters due to air disturbance as external influence at a first torsion frequency, i.e., a resonant frequency in a first torsion mode. The sway or flutter of the head suspension at the first torsion mode is hereinafter referred to as "T1 windage" and the first torsion frequency is hereinafter is referred to as "T1 frequency." The "T1 windage" is also indicative of the property of the sway or flutter of the head suspension. The T1 windage results in limit in improvement of positioning accuracy of the head suspension to a track.

On the other hand, the number of tracks per one inch tends to be gradually increased due to increase of a recording density of a hard disk. As this result, a track pitch becomes narrow and an allowable range of a positional deviation of the head to a track becomes further narrow. Therefore, further improvement of the positioning accuracy of the head suspension is required. The positional deviation of the head is hereinafter referred to as "off-track."

In this way, improvements of the shock property and the T1 windage are in a trade-off relationship, but simultaneous pursuit of the both is a factor in the miniaturization of the hard disk drive.

At present, the off-track of the head is controlled by suppressing frequency with a control system. However, the control system suppresses the frequency in a range of about 0.8 to 1.3 kHz only. Therefore, the frequency excepting the range due to air disturbance can not be suppressed securely. A property of the control system almost depends on a main torsion mode of a carriage of a head suspension. Resonant frequencies in the main torsion mode are about 5 kHz in a 3.5-inch hard disk drive and about 6 kHz in a 2.5-inch hard disk drive. Accordingly, when the head suspension has T1 frequency and sway frequency which are lower than the resonant frequencies in the main torsion mode, stability of the control system may be adversely affected.

A resonant frequency in a first bending mode of the head suspension may affect stability of the control system related to the main mode of the carriage or the like. The resonant frequency in the first bending mode is hereinafter referred to as "B1 frequency." Further, when the B1 frequency is low, the shock property also degrades. For the details of the above-mentioned related arts, Japanese Unexamined Patent Application Publication No. 09-282624 and U.S. Patent Publication No. 6765759B2.

SUMMARY OF THE INVENTION

An object of the present invention is to provide a method of manufacturing a head suspension, capable of smoothly forming a head suspension in which T1 windage is improved by raising T1 frequency and sway frequency while improving a shock property.

In order to accomplish the object, the present invention is most characterized by a resilient part manufacturing step forming a resilient member integrated with the reinforcing parts or a flexure manufacturing step forming a flexure integrated with the resilient part and the reinforcing parts.

An aspect of the present invention provides a method of manufacturing a head suspension which has reinforcing parts each expanding and connecting between a rigid part of a load beam and each of protrusions formed on each side edges of a joint provided with the rigid part. The joint is connected to a resilient part separated from the rigid part. The method includes a resilient part manufacturing step forming a resilient member integrated with the reinforcing parts or a flexure manufacturing step forming a flexure integrated with the resilient part and the reinforcing parts.

According to this aspect of the present invention, the head suspension in which T1 windage is improved by raising T1 frequency and sway frequency with the reinforcing parts while improving a shock property can be easily formed without special steps for forming the reinforcing parts.

DETAILED DESCRIPTION OF EMBODIMENTS

Head suspension according to embodiments of the present invention will be explained in detail. Each of the embodiments realizes to form a head suspension in which T1 windage is improved by raising T1 frequency and sway frequency while improving a shock property without special steps.

First Embodiment

A structure of the head suspension will be explained with reference to FIGS. 1 and 2.

Figure 1:
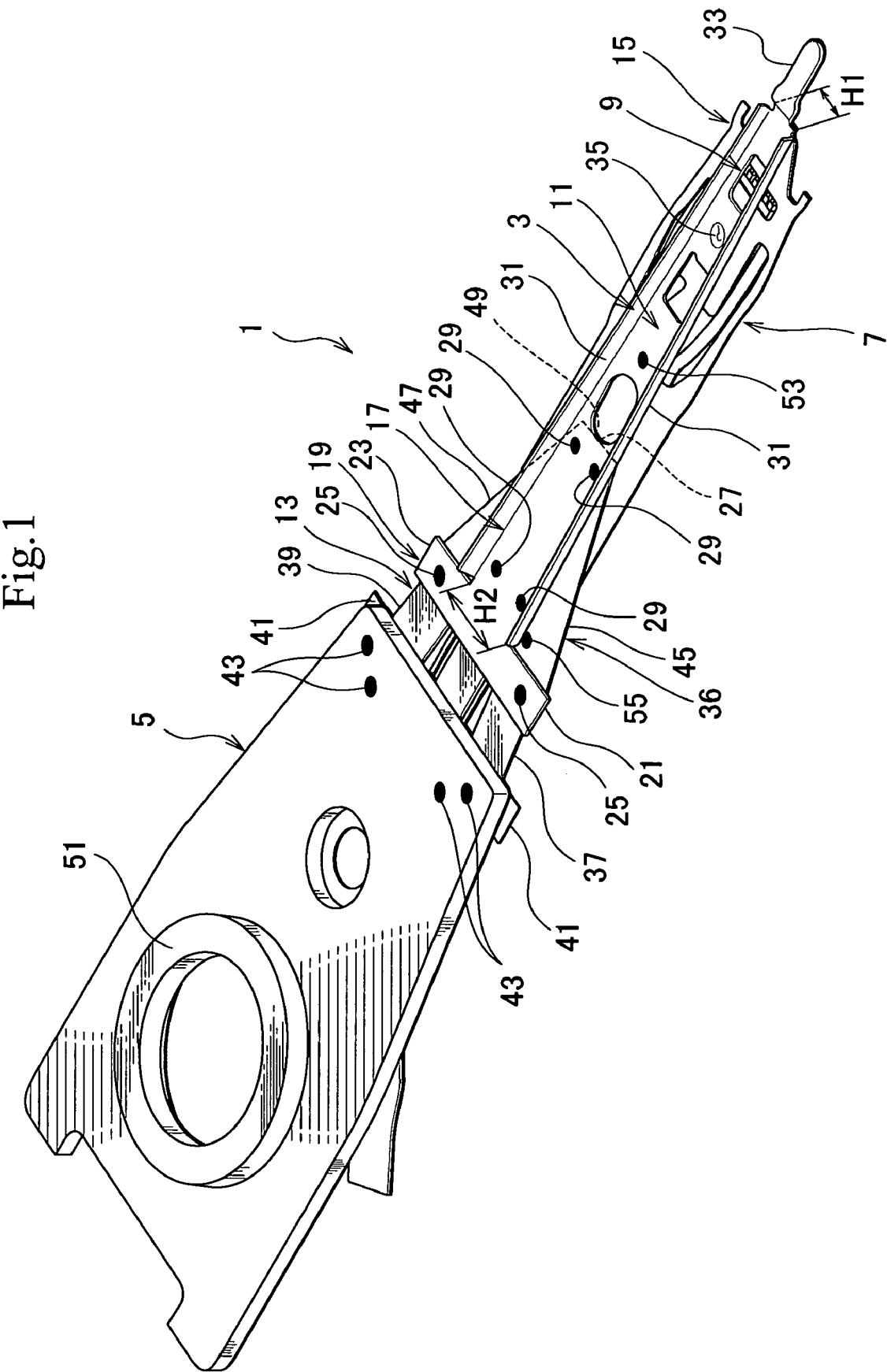
FIG. 1 is a perspective view showing a head suspension according to a first embodiment of the present invention on an opposite-to-disk side.
Figure 2:
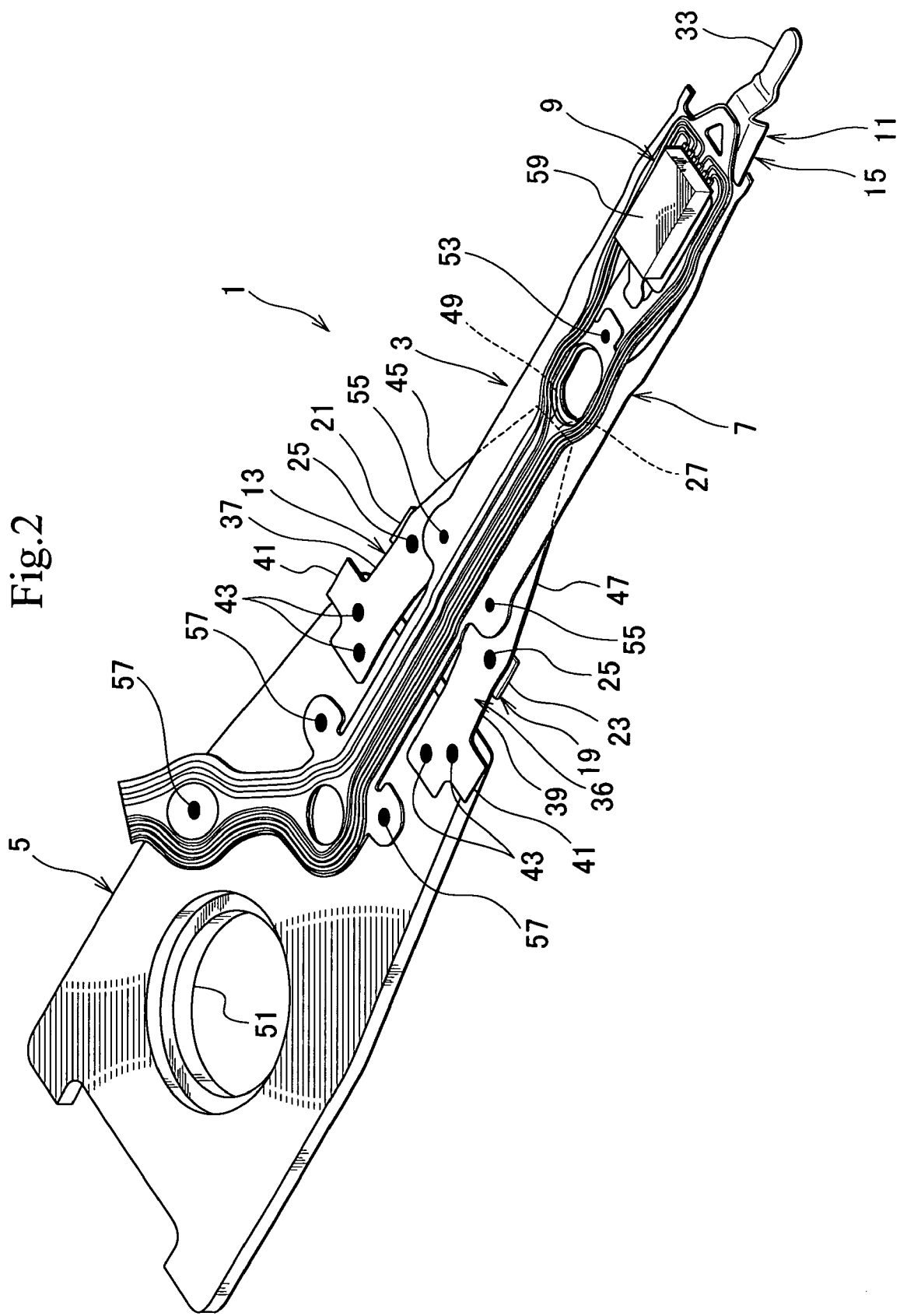
FIG. 2 is a perspective view showing the head suspension of FIG. 1 on a disk side.

FIG. 1 is a perspective view showing a head suspension according to a first embodiment of the present invention on an opposite-to-disk side, and FIG. 2 is a perspective view of the head suspension of FIG. 1 on a disk side. In this specification, the "disk" is a storage medium which is arranged in a hard disk drive and to and from which data is written and read through a head supported by the head suspension. The opposite-to-disk side is one side of the head suspension 1 that is oriented opposite to the disk. On the other hand, disk side is other side of the head suspension 1 facing the disk.

Shock property of the load beam is expressed with the magnitude of a shock at which the slider of the load beam is lifted from the surface of a disk. The phenomenon that a slider of a load beam lifts off from the surface of a disk in response to the application of a shock is referred to as "G-lift-off." The "G-lift-off" is also indicative of the magnitude of the shock that causes a lift-off of the slider.

As shown in FIGS. 1 and 2, the head suspension 1 includes a load beam (LB) 3, a base plate 5 corresponding to a base, and a flexure 7. The head suspension 1 shown in FIGS. 1 and 2 is used for, for example, a 2.5-inch hard disk drive.

The load beam 3 applies a gram load that is a load onto a head 9. The head 9 is arranged at a front end of the load beam 3, to write and read data to and from the disk. The load beam 3 includes a rigid part (flange portion or beam) 11 and a resilient part (hinge or hinge portion) 13.

The rigid part 11 is made of, for example, a thin stainless steel plate. The rigid part 11 is extended from a front end 15 to a base end 17. The rigid part 11 has a body which gradually becomes narrow from the base end 17 toward the front end 15. The body of the rigid part has a wholly narrow shape narrower than the resilient part 13. In the first embodiment, the rigid part 11 is set such that a width H1 of the front end 15 is 0.4 mm and a width H2 of a base end 17 is 0.96 mm.

The rigid part 17 is integrally provided with a joint 19 at the base end 17. On both sides of the joint 19 in an across-the-width direction of the load beam 3, protrusions 21 and 23 are formed. The protrusions 21 and 23 protrude from both sides of the rigid part 11 in the across-the-width direction. Therefore, the rigid part 11 including the joint 19 is formed in a T shape wholly.

The joint 19 of the rigid part 11 overlaps a first end of the resilient part 13, to be fixed and supported to the resilient part at two welded spots 25 by laser welding or the like. The vicinity of the base end 17 of the rigid part 11 also overlaps an extension 27 of the resilient part 13 described later, to be fixed and supported to the extension 27 at total four welded spots 29 of two welded spots relatively located at a front side and two welded spot relatively located at a rear side in an extending (longitudinal) direction of the load beam 3. The number of welded spots 25 or 29 is not limited to the specific number, and the number may be selected optionally.

The rigid part 11 has rails 31 formed along both side edges of the body thereof in the across-the-width direction. The rails 11 and 13 are raised from the body in a thickness direction of the rigid part 11 by box-bending adjacent portions adjacent to the body of the rigid part 11. Each rail 31 is extended from the front end 15 to the base end 17 just before the joint 19 of the rigid part 11 thought a portion of the resilient part 13 arranged on the extension 27. Namely, the rail 31 is extended over an approximately entire length of the rigid part 11. The rail 31 has the same thickness as the body of the rigid part 11. The thickness of the whole area or a part of the rail 31 may formed to be thinner than that of the body of the rigid part 11 by partial etching or the like.

The rigid part 11 has a tab 33 for loading and unloading at the front end 15 thereof and a dimple 35 in the vicinity of the front end 15.

The resilient part 13 comprises a resilient member 36 separated from the rigid part 11. The resilient member 36 is made of, for example, a thin stainless rolled plate having a spring or resilient property. The resilient member 36 has bifurcated branches 37 and 39 extending toward the base plate 5 on a second end. The branches 37 and 39 are continuously integrated with each other on the joint 19. Each of branches 37 and 39 has a cut part 41 remaining on an outer side edge in the across-the-width direction. The cut part 41 is cut along it when a sheet material is cut into a plurality of resilient members 36. Each of ends of the branches 37 and 39 of the resilient member 36 overlaps on an end of the base plate 5 to be fixed and supported to the base plate 5 at two welded spots 43 by laser welding or the like.

The resilient member 36 has the extension 27 on the first end. The extension 27 is extended, toward the front end 15 of the rigid part 11, from a portion arranged on the joint 19 to a portion arranged on the vicinity of the base end 17 of the rigid part 11. The extension 27 has a length which is about ⅓ of the length of the rigid part 11 in this embodiment. The length of the extension 27 may be set in a range of ¼ to ½ of the length of the rigid part 11.

The resilient member 36 has reinforcing parts 45 and 47 on both sides of the extension 27 in the across-the-width direction, respectively. The each reinforcing part is expanded between the each protrusion of the joint 19 to the front end 49 of the extension 27. Therefore, the reinforcing parts 45 and 47 are expanded between both protrusions 21 and 23 of the joint 19 and the vicinity of the base end 17 of the rigid part 11, to connect or bridge the protrusions 21 and 23 and the rigid part 11. Each reinforcing part has a wing shape gradually expanding in the across-the-width direction of the load beam 3 from the rigid part 11 side toward the joint 19 side. According to the first embodiment, the wing shape of the reinforcing part is a triangular wing shape. The wing shape may be set in an arbitrary shape such as a trapezoidal shape capable of achieving a function as a reinforcing part. The reinforcing parts 45 and 47 serve as struts to reinforce a portion between both protrusions 21 and 23 of the joint 19 and the vicinity of the base end 17 of the rigid part 11 without adding a special member.

The base plate 5 includes a boss 51 to be attached to an arm supported to the carriage via the boss 51 by swaging or the like. Accordingly, the base plate 5 can be turned around a spindle of the carriage. The base plate 5 may be formed integrally at a front end of an arm to be supported to the carriage.

The flexure 7 is a thin electrically conductive plate such as a thin stainless steel rolled plate (SST) having a spring or resilient property. The flexure 7 has an insulating layer formed on the thin plate. On the insulating layer, read/write wiring patterns are formed. The flexure 7 is extended from the front end 15 of the rigid part 11 toward the base plate 5. The flexure 7 is fixed to the rigid part 11 at a welded spot 53 by laser welding or the like, it is fixed to the resilient member 36 at welded spots 55 by similar laser welding, and it is also fixed to the base plate 5 at welded spot 57 by similar laser welding. One end of the flexure wiring patterns are electrically connected to write and read terminals supported on the slider 59 of the head 9.

Operations and advantages of the first embodiment will be explained.

Figure 50:
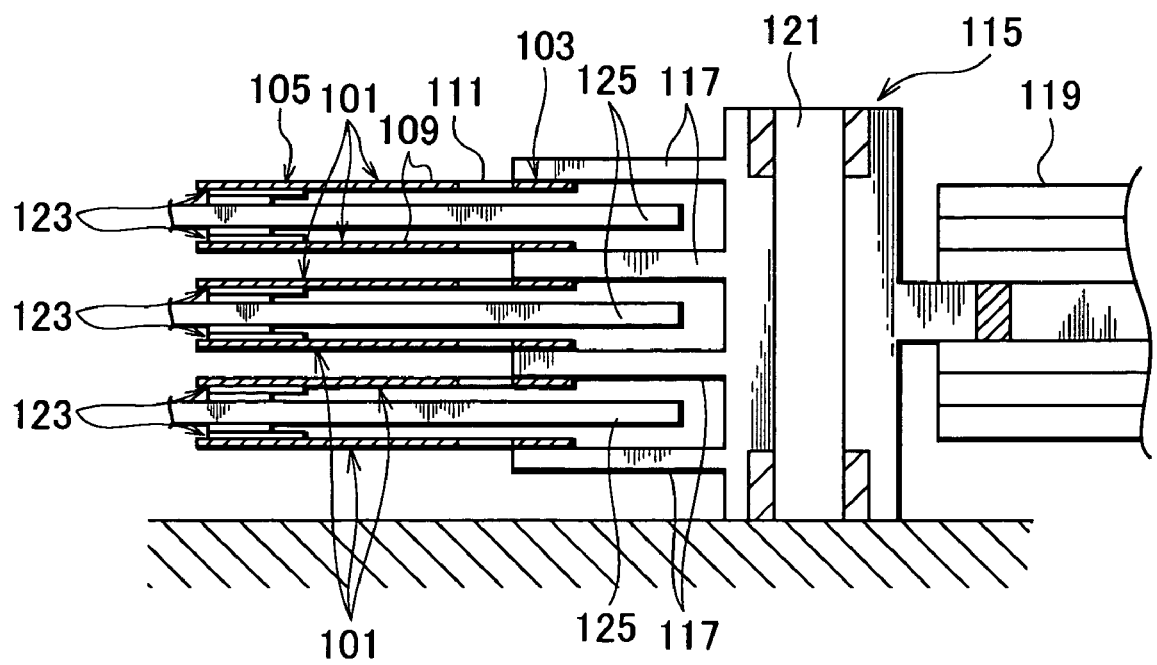
FIG. 50 is a partly sectioned view showing an example of a hard disk drive in which head suspensions of FIG. 49 are arranged.

According to the first embodiment, the head suspension 1 is attached to the carriage for a plurality of disks in a similar manner as the case shown in FIG. 50. The head suspension 1 may be attached for one disk.

When the disk rotates at high speed, the head 9 of the head suspension 1 slightly floats from the surface of the disk against the gram load. The head 9 is moved to a target track on the disk by pivoting of the arm of the carriage.

According to the first embodiment, the head suspension 1 includes the rigid part 11 and the resilient part 13 comprising the resilient member 36 separated from the rigid part 11. The joint 19 is provided on the base end of the rigid part 11 and is fixed and supported to the resilient member 36. The joint 19 has the protrusions 21 and 23 which protrude from both the sides of the rigid part 11 in the across-the-width direction. The reinforcing parts 45 and 47 are arranged between the protrusions 21 and 23 of the joint 19 and the vicinity of the rigid part 11, to connect or bridge both the protrusions 21 and 23 of the joint 19 and the vicinity of the base end 17 of the rigid part 11. Therefore, the head suspension 1 enables to increase the rigidity of the load beam 3 in the sway direction to raise the sway frequency while increasing G-lift-off to improve the shock property using the narrow rigid part 11.

The rails 31 are formed on the both side edges of the rigid part 11 in the across-the-width direction to extend from the front end 15 of the rigid part 11 to a portion just before the joint 19 of the rigid part 11 through the portion of the resilient part 13 located on the extension 27. Namely, the rail 31 is expanded over an approximately entire length of the rigid part 11. The structure can secure longitudinal rigidity of the rigid part 11 while the rigid part 11 is reduced in thickness and weight, so that high T1 frequency and a high B1 frequency can be obtained.

Thereby, the T1 windage can be improved without degrading other properties.

According to the first embodiment, the reinforcing parts 45 and 47 are formed in a triangular wing whose width gradually expands from the front end 15 side of the rigid part 11 toward the joint 19. Therefore, the reinforcing parts 45 and 47 can serve as struts and reinforce a portion of the rigid part 11 positioned between the protrusions 21 and 23 of the joint 19 and the vicinity of the base end 17 of the rigid part 11 without adding a special member.

Since the extension 27 is set in a range of ¼ to ½ of the length of the rigid part 11, in the first embodiment, about ⅓, weight reduction of the load beam 3 can be reliably achieved while the rigid part 11 is reinforced by the resilient member 36.

Grounds for simultaneous pursuit of shock property and T1 windage or the like will be explained with reference to FIGS. 3 to 32.

As described above, in the head suspension, when the load beam is made thin in order to improve the shock property, the problematic swaying or fluttering of the head suspension occurs due to air disturbance.

The T1 windage which is swaying or fluttering of a head suspension due to air disturbance will be explained.

Figure 3:
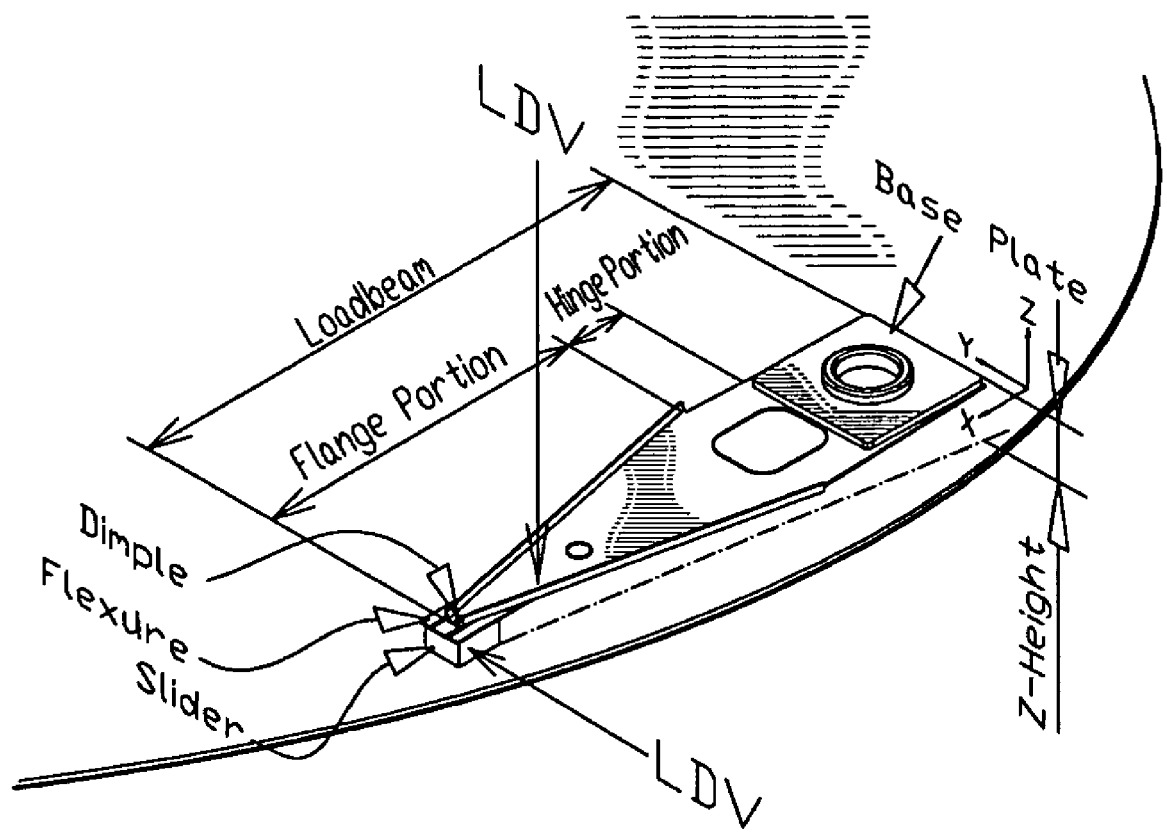
FIG. 3 is a schematic perspective view showing a method for measuring T1 windage.

FIG. 3 is a schematic perspective view showing a method for measuring T1 windage. As shown in FIG. 3, a track direction displacement (windage) of a slider and a load beam amplitude are measured using a laser doppler velocimeter (LDV in FIG. 3) and a fast fourier transform (FFT) analyzer. In the specification, "Z-height" is indicative of a height of a head from a base of a head suspension assembled in a hard disk drive in a Z direction (vertical direction).

In general, a hard disk drive allows a position error within ±5% of a track pitch, and does not allow a position error exceeding the range for reliable reading and writing data. For example, in case of applying disks each having 100 kTPI of the number of tracks per one inch to a hard disk drive, the track pitch is 254 nm, and the position error must be suppressed within ±12.7 nm which is 5% of the track pitch.

Swaying or fluttering of such a head suspension suppressed by a control system is limited to a range of 0.8 to 1.3 kHz, and a high frequency region can not be suppressed.

Then, the swaying or fluttering of the head suspension at a disk revolution speed of 10000 rpm is several times that at a disk revolution speed of 5400 rpm. Therefore, how to suppress the swinging is a problem to be solved, which requires improvement of the head suspension itself.

Figure 4:
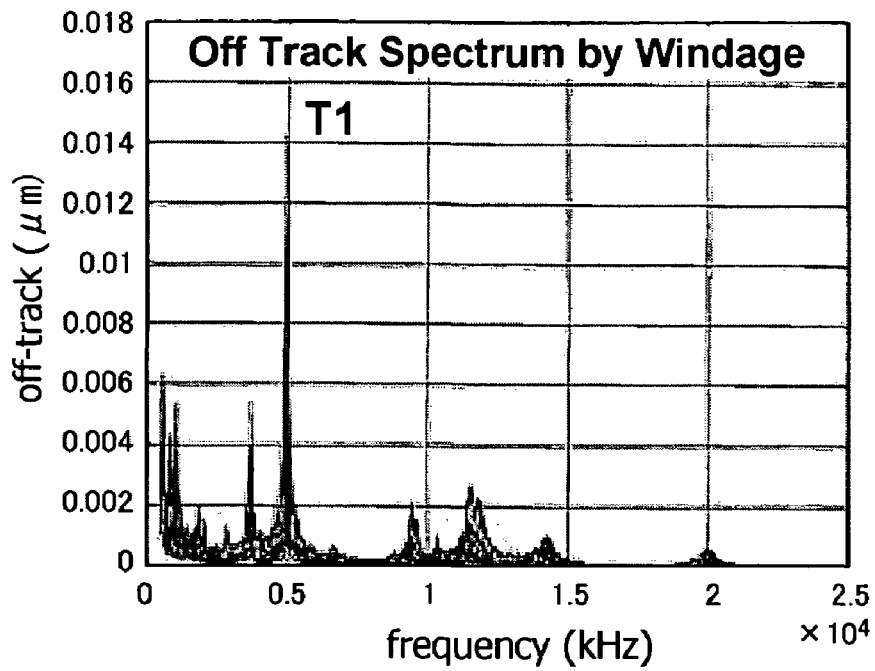
FIG. 4 is a graph showing a relationship between off-track of the head suspension and frequency.
Figure 5:
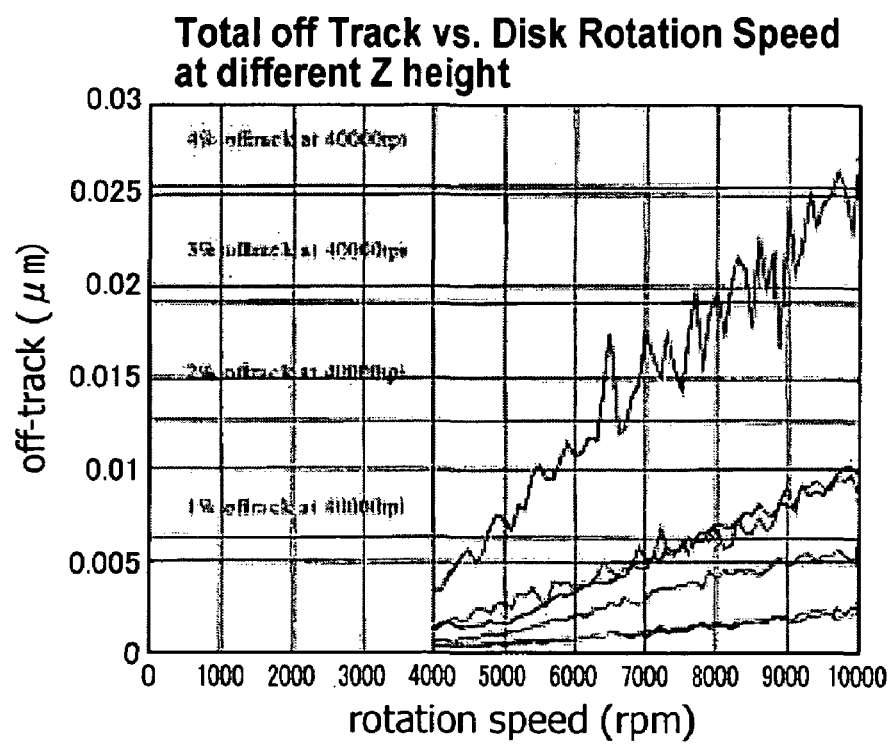
FIG. 5 is a graph showing a relationship between off-track of the head suspension and rotational speed of a disk.

FIG. 4 is a graph showing a relationship between off-track of the head suspension and frequency due to air disturbance, and FIG. 5 is a graph showing a relationship between total off-track of the head suspension and rotational speed of a disk. The graph of FIG. 5 is based on the result obtained by measuring off track to the disk revolution speed at several different Z-heights.

It is understood from FIG. 4 that the peak of T1 is large as compared with the others and it is a main factor of the off-track.

As is apparent in FIG. 5, the revolution speed of the disk of an abscissa becomes two times, for example changes from 5000 rpm to 10000 rpm or twice, the off-tack becomes four times. Thereby, when the revolution speed of the disk becomes twice, influence of the air disturbance shown in FIG. 4 also becomes four times.

Figure 6:
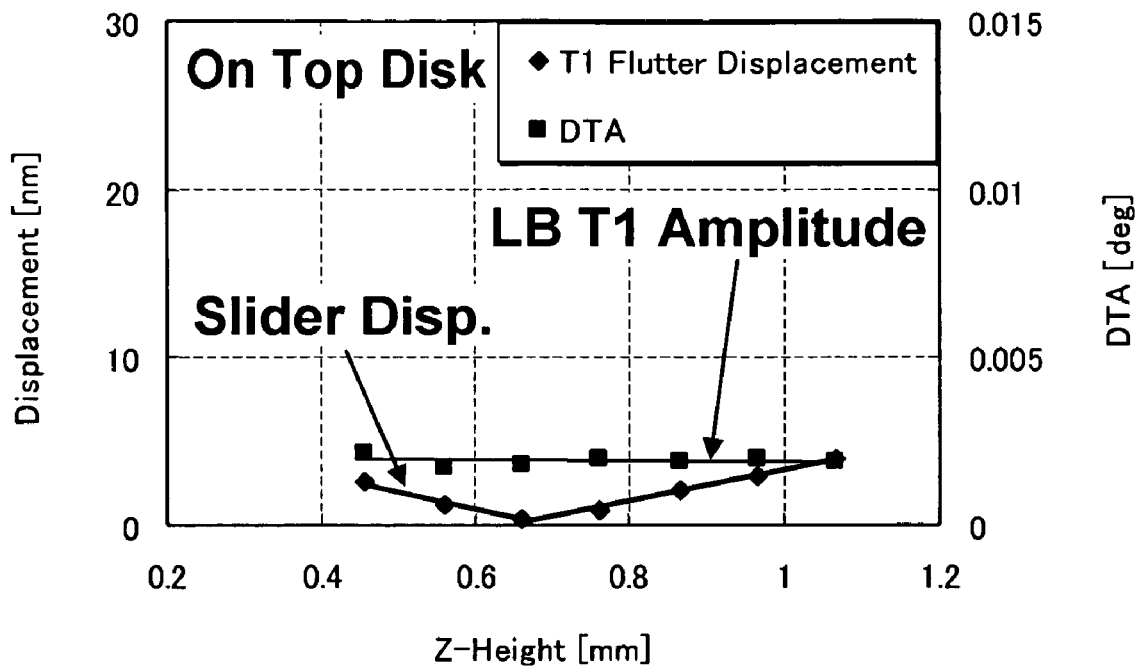
FIG. 6 is a graph showing a relationship between dynamic T1 angle (DTA) or T1 amplitude of a load beam and slider T1 displacement or T1 flutter displacement thereof in head suspensions having different Z-heights due to T1 windage on a top disk or one disk.
Figure 7:
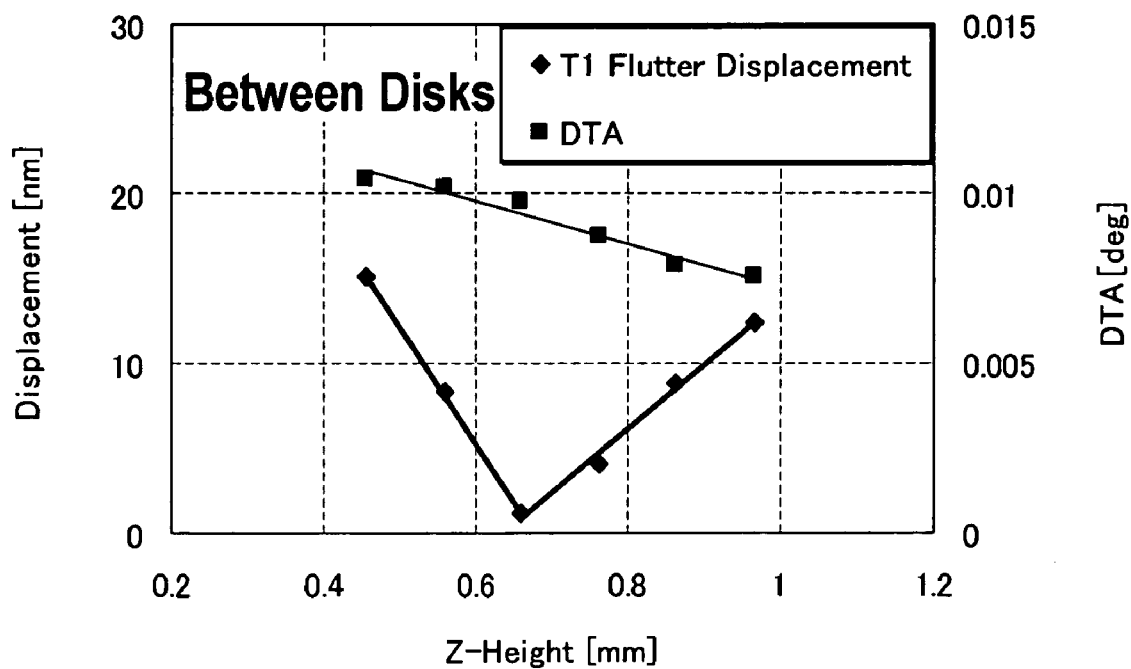
FIG. 7 is a graph showing a relationship between dynamic T1 angle (DTA) or T1 amplitude of a load beam and slider T1 displacement or T1 flutter displacement thereof in head suspensions having different Z-heights due to T1 windage between two disks.

FIGS. 6 and 7 are graphs each showing a relationship between the dynamic T1 angle (DTA) or T1 amplitude of a load beam and the slider T1 displacement or the T1 flutter displacement thereof in head suspensions having different the Z-heights due to the T1 windage. FIG. 6 shows the result of the head suspensions used for one disk, and FIG. 7 shows the result of the head suspensions arranged between two disks.

As is apparent in FIGS. 6 and 7, the DTA of the load beam and the lateral displacement of the slider between two disks become slightly larger than five times those in the case of one disk. Accordingly, the air disturbance between disks increases so that off-track of the slider reacts sensitively to the Z-height change.

In general, as winds swaying or fluttering a rigid body, there are various kinds of winds including Karman vortex and Buffeting flow as representative ones.

The Karman vortex is a burble at a specific frequency, while the Buffeting flow is a flow having nonsteady pressure fluctuation proportional to a square of a wind velocity. Accordingly, the buffeting flow relates to the swaying or fluttering of the head suspension of the hard disk drive, so that a structure is vibrated up to a very high frequency.

Therefore, against the buffeting flow, it is necessary to adopt measures for reducing wind velocity in a whole system and strengthen the head suspension as the structure so as not to sway or fluttering even if pressure fluctuation occurs.

Next, in order to strengthen the head suspension as the structure, a static torsion angle (STA) is examined.

Figure 8:
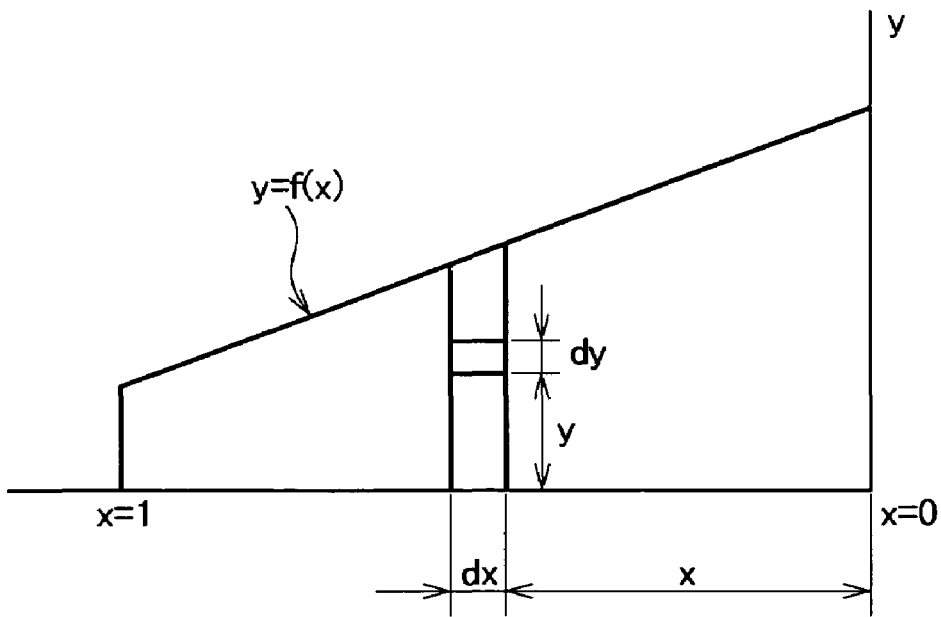
FIG. 8 is a graph showing a load beam shape function.
Figure 9:
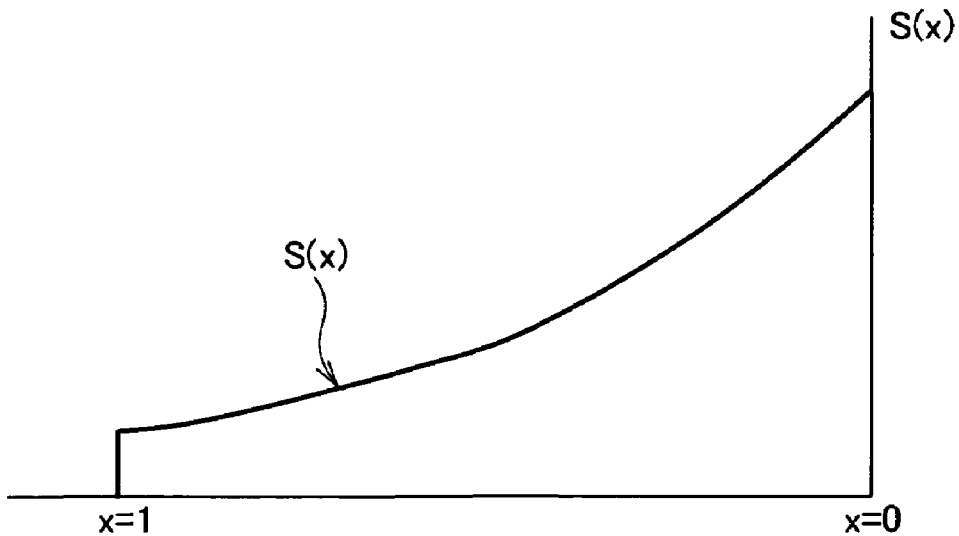
FIG. 9 is a graph showing load beam torsion rigidity.

FIG. 8 is a graph showing a load beam shape function, and FIG. 9 is a graph showing a load beam torsion rigidity.

In FIG. 8, a moment M(x) acting on one point x of a rigid part of a load beam is expressed as follows:

$$M(x) = \int_0^{f(x)} F(t) \cdot y \, dy \, dx \quad (1)$$

As shown in FIG. 9, torsion rigidity S(x) can be calculated as a function of x. Accordingly, a torsion angle θ at a dimple can be expressed as follows on the basis of the expression (1) and the S(x):

$$\theta = F(t) \int_0^1 \frac{\int_0^{f(x)} y \, dy}{S(x)} \, dx \quad (2)$$

Assuming nonsteady fluid force $F(t)=1$ (N/m²), the expression (2) is changed as follows:

$$\theta = \int_0^1 \frac{\int_0^{f(x)} y \, dy}{S(x)} \, dx \quad (3)$$

That is, the STA is strength based on an angle θ at which the head suspension is twisted when fluid force which is always 1 is applied to a projection area of the head suspension. A torsion rigidity of a point on an area of a load beam to a moment is calculated. Therefore, when division is made as the expression (2), the torsion angle θ generated when a force is applied to the point can be obtained. When all the torsion angles are summed, a torsion angle θ obtained when static force is applied in a range from x=0 to the dimple can be obtained, so that the expression (3) is obtained as $F(t)=1$(N/m²), which is called "STA". When the STA is large, the head suspension is swayed or fluttered by applying a wind thereto, but when the STA is small, the head suspension is not so swayed or fluttered by applying the same wind thereto.

FIGS. 10 to 13 are graphs showing relationships between dynamic T1 angle (DTA) of a load beam and slider T1 displacement or T1 flutter displacement thereof, and a Z-height due to T1 windage to a head suspension having different static torsion angles (STA).

Figure 10:
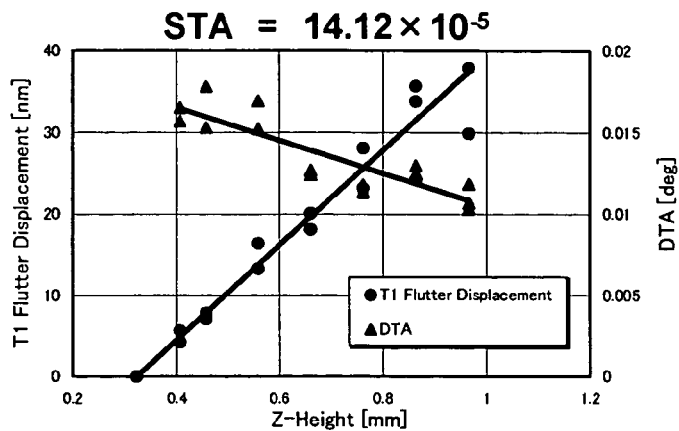
FIG. 10 is a graph showing a relationship between dynamic T1 angle (DTA) or T1 amplitude of a load beam or slider T1 displacement or T1 flutter displacement thereof, and Z-height due to T1 windage to a head suspension having one static torsion angle (STA)
Figure 11:
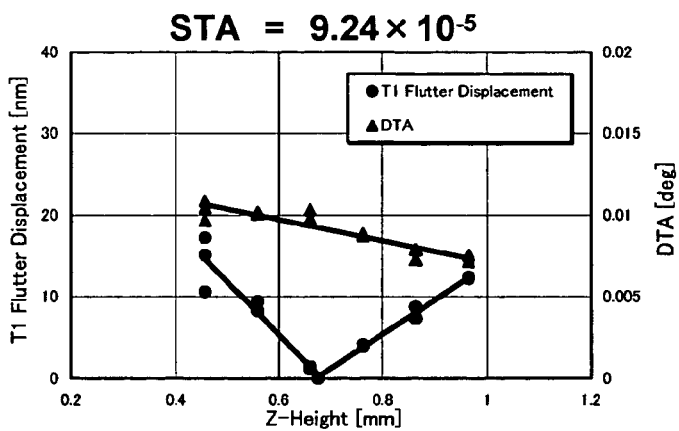
FIG. 11 is a graph showing a relationship between dynamic T1 angle (DTA) or T1 amplitude of a load beam or slider T1 displacement or T1 flutter displacement thereof, and Z-height due to T1 windage to a head suspension having another static torsion angle (STA)
Figure 12:
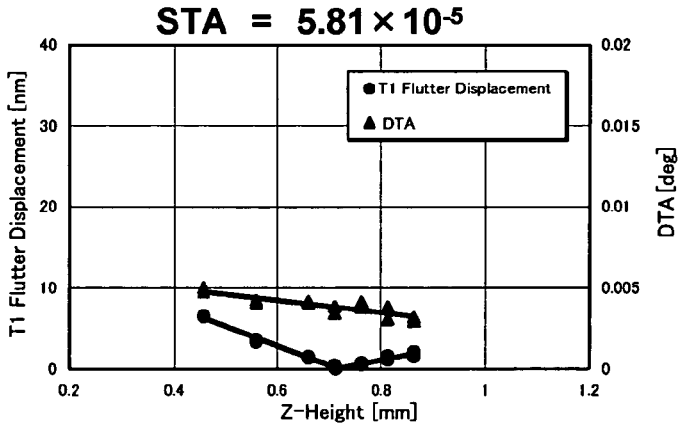
FIG. 12 is a graph showing a relationship between dynamic T1 angle (DTA) or T1 amplitude of a load beam or slider T1 displacement or T1 flutter displacement thereof, and Z-height due to T1 windage to a head suspension having still another static torsion angle (STA)
Figure 13:
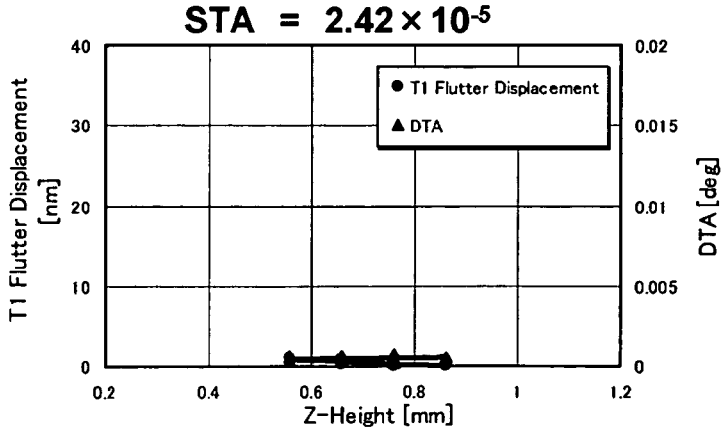
FIG. 13 is a graph showing a relationship between dynamic T1 angle (DTA) or T1 amplitude of a load beam or slider T1 displacement or T1 flutter displacement thereof, and Z-height due to T1 windage to a head suspension having still another static torsion angle (STA)

The graph shown in FIG. 10 corresponds to STA=14.12× $10^{-5}$, the graph shown in FIG. 11 corresponds to STA=9.24× $10^{-5}$, the graph shown in FIG. 12 corresponds to STA=5.81× $10^{-5}$, and the graph shown in FIG. 13 corresponds to STA=2.42×$10^{-5}$. In FIGS. 10 to 13, the plot Δ corresponds to DTA of the load beam, and the plot • corresponds to T1 flutter displacement, namely, sensitivity of the off-track of the slider based on the Z-height. The sensitivity is represented with "T1 windage ZH sensitivity."

As is apparent in FIGS. 10 to 13, the DTA of the load beam becomes gradually small according to lowering of the STA. Thereby, the change of the T1 flutter displacement becomes flat.

Figure 14:
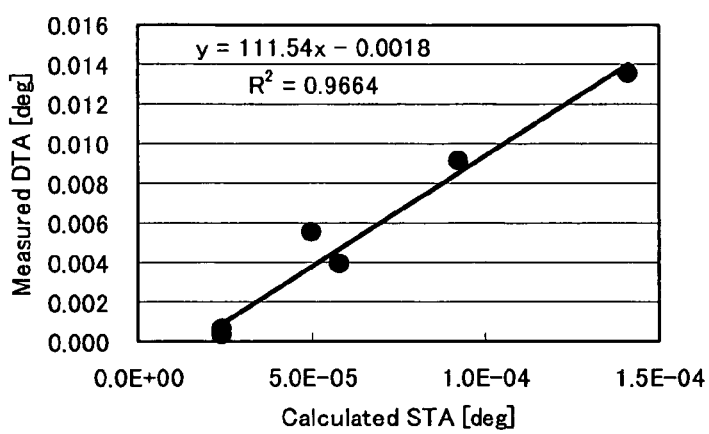
FIG. 14 is a graph showing a relationship between calculated STA and measured DTA.

While FIGS. 10 to 13 show the measured values, FIG. 14 is a graph showing a relationship between the calculated STA and the measured DTA.

As is apparent in FIG. 14, the calculated STA and the measured DTA are in proportional relationship, and a straight line showing the proportional relationship does not pass through 0. Namely, when the calculated STA is made small, an excellent head suspension against the T1 windage can be obtained.

Figure 15:
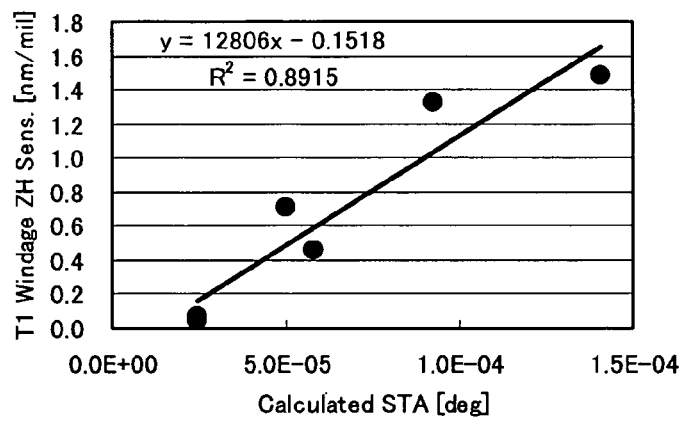
FIG. 15 is a graph showing a relationship between calculated STA and T1 windage ZH sensitivity.
Figure 16:
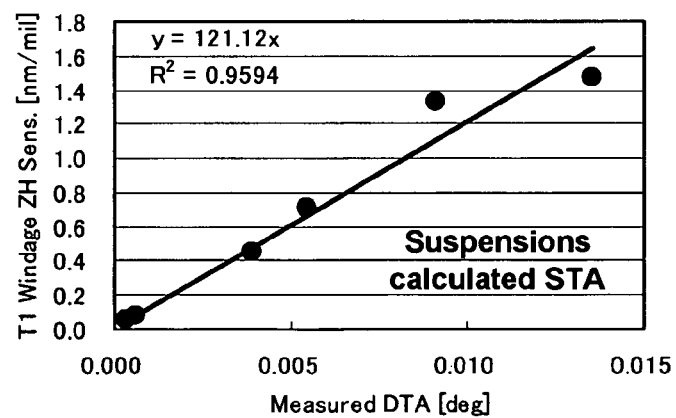
FIG. 16 is a graph showing a relationship between measured DTA and T1 windage ZH sensitivity.
Figure 17:
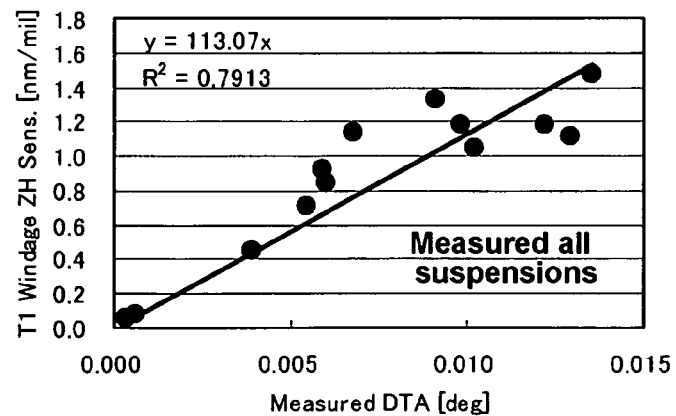
FIG. 17 is a graph showing a relationship between measured DTA and T1 windage ZH sensitivity plotted from the value regarding a plurality of head suspensions.

FIG. 15 is a graph showing a relationship between the calculated STA and the T1 windage ZH sensitivity, FIG. 16 shows a graph showing relationship between the measured DTA and the T1 windage ZH sensitivity, and FIG. 17 is a graph showing a relationship between the measured DTA and the T1 windage ZH sensitivity plotted from the value regarding a plurality of head suspensions.

FIGS. 15 to 17 show such a fact that the measured DTA and the T1 windage ZH sensitivity is in a proportional relationships, from which it is apparent that the STA is desirable to be reduced relative to the T1 windage. The T1 windage ZH sensitivity is as plotted as mark • in FIGS. 10 to 13, and reduction of the STA means that a broken line representing the T1 windage ZH sensitivity becomes flat.

In fact, a movement of the head suspension is dynamic, so that it is considered that the swaying or fluttering of the head suspension is influenced by inertia. In calculation for the STA, the inertia is not considered. Accordingly, it is necessary to make consideration including the inertia in fact. Therefore, FIGS. 18 to 21 show graphs based on frequency.

Figure 18:
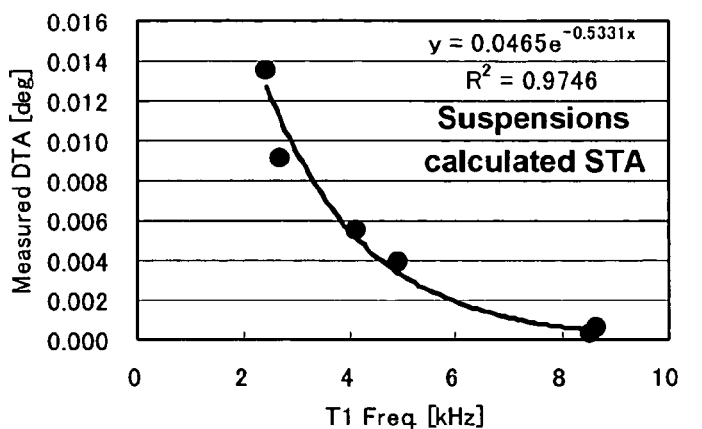
FIG. 18 is a graph showing a relationship between T1 frequency and measured DTA.
Figure 19:
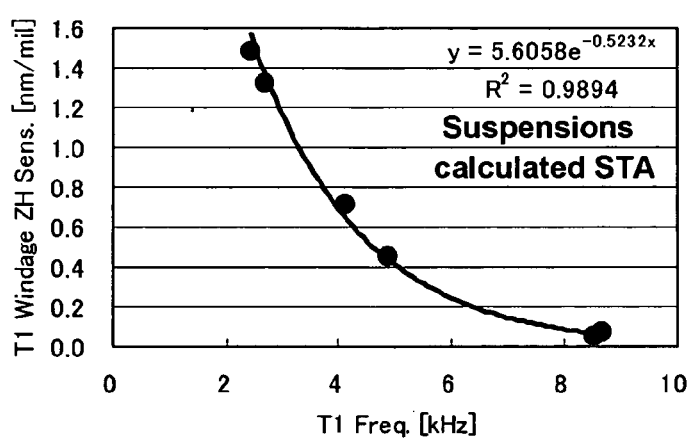
FIG. 19 is a graph showing a relationship between T1 frequency and T1 windage ZH sensitivity.
Figure 20:
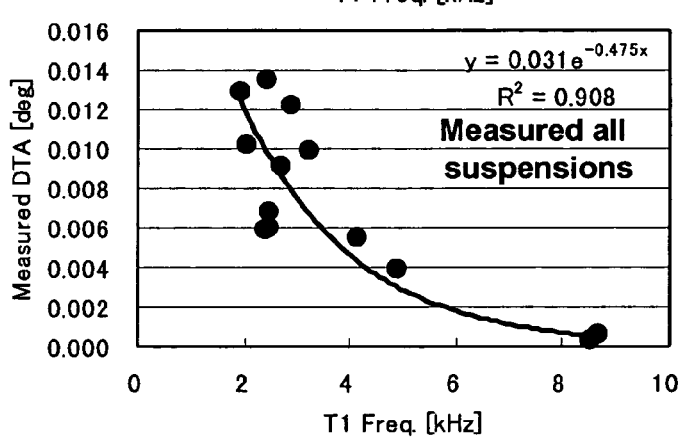
FIG. 20 is a graph showing a relationship between T1 frequency and measured DTA plotted from the value regarding a plurality of head suspensions.
Figure 21:
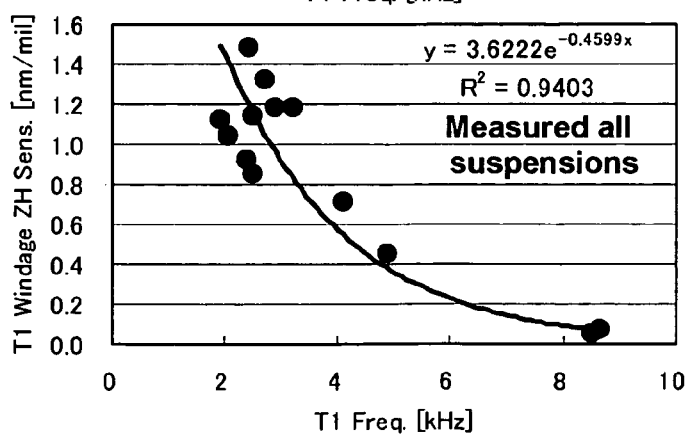
FIG. 21 is a graph showing a relationship between T1 frequency and T1 windage ZH sensitivity plotted from the value regarding a plurality of head suspensions.

FIG. 18 is a graph showing a relationship between the T1 frequency and measured DTA, FIG. 19 is a graph showing a relationship between the T1 frequency and the T1 windage ZH sensitivity, FIG. 20 is a graph showing a relationship between the T1 frequency and the measured DTA plotted regarding a plurality of head suspension, and FIG. 21 is a graph showing a relationship between the T1 frequency and the T1 windage ZH sensitivity plotted from the value regarding a plurality of head suspension.

As apparent from FIGS. 18 to 21, both the measured DTA and the T1 windage ZH sensitivity become small in a quadric manner according to increase in the T1 frequency.

In other words, a fact that the T1 frequency is high means that torsion rigidity is high and the inertia is light. Therefore, both the measured DTA and the T1 windage ZH sensitivity become small in a quadric manner, as described above. However, when the measurement is performed regarding a plurality of head suspensions, variations are appeared as shown in FIGS. 20 and 21. Especially, such variations are significant in a low frequency region.

Therefore, the relationship among the STA, the T1 frequency F, and the inertia I has been considered from their dimensional formula.

When the thickness of the load beam, the length thereof, and the width thereof are represented by T, L, and W, the respective dimensional formula are expressed as follows:

$$STA \propto W \times L^2 \times T^3$$

$$F \propto T/L/W$$

$$I \propto T \times L \times W^3$$

Figure 22:
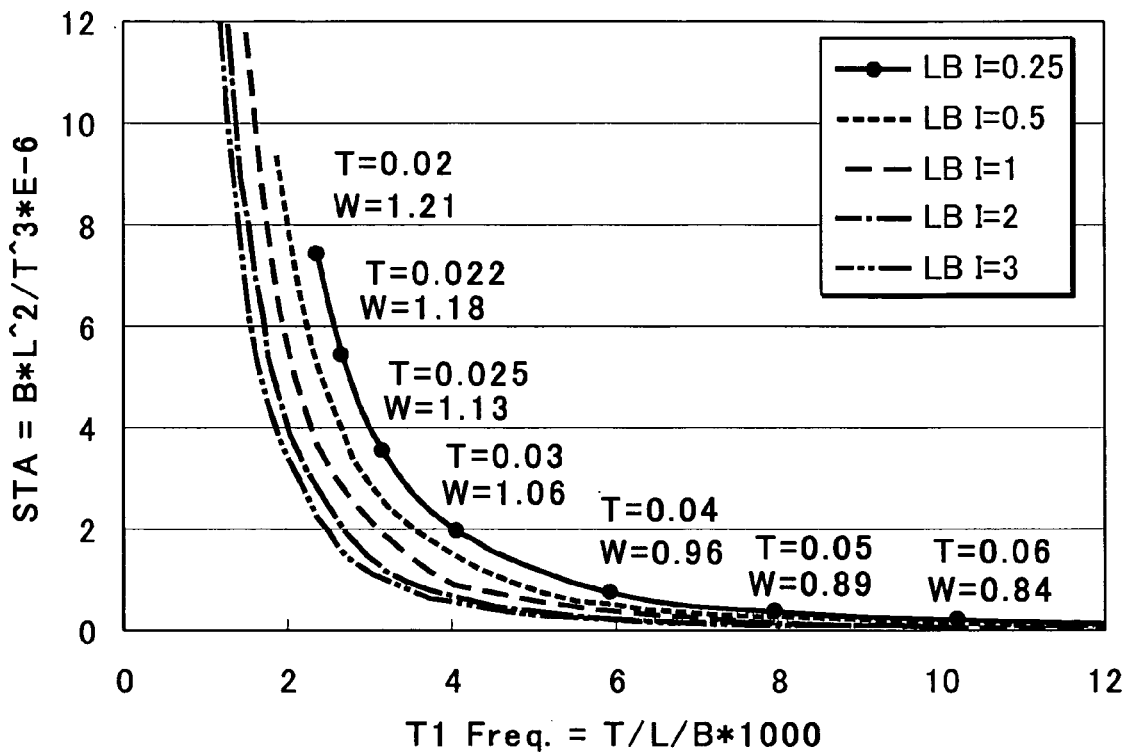
FIG. 22 is a graph showing a relationship between T1 frequency and STA.
Figure 23:
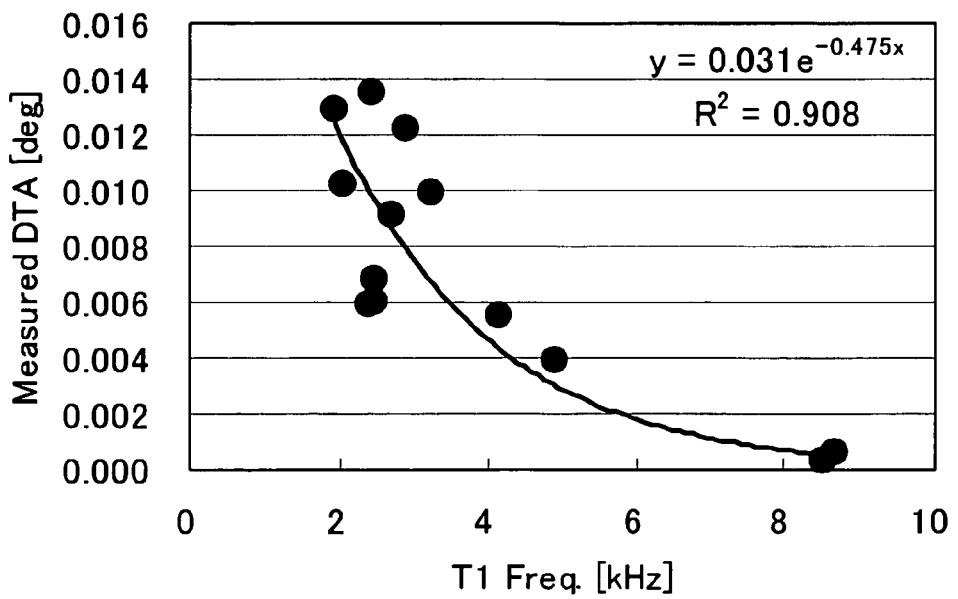
FIG. 23 is a graph showing a relationship between T1 frequency and measured DTA plotted from the value regarding a plurality of head suspensions.

FIG. 22 is a graph showing a relationship between the T1 frequency and the STA dimension where the inertial is used as a parameter. In FIG. 22, the length L of the load beam is fixed to 7 mm and the thickness T is changed from 0.02 mm to 0.1 mm. For example, by fixing the length L and the thickness T to 7 mm and 0.02 mm and utilizing the inertial as a parameter, the width W of the load beam can be calculated and the STA and the F can be calculated and plotted.

As shown in FIG. 22, when the STA is assumed as the T1 windage, a change thereof relative to the T1 frequency becomes non-linear, i.e., quadric, and the influence of the inertia is large especially in a low region of the T1 frequency. This coincides with a graph shown in FIG. 23.

As apparent from the above calculations, a thick and narrow load beam is effective to obtain high T1 frequency and small STA. That is, the thick and narrow load beam brings small inertia and high torsion rigidity. As apparent from the measured values, a load beam with the T1 frequency of 8 kHz or more is preferable.

Comparison results will be explained.

Figure 24:
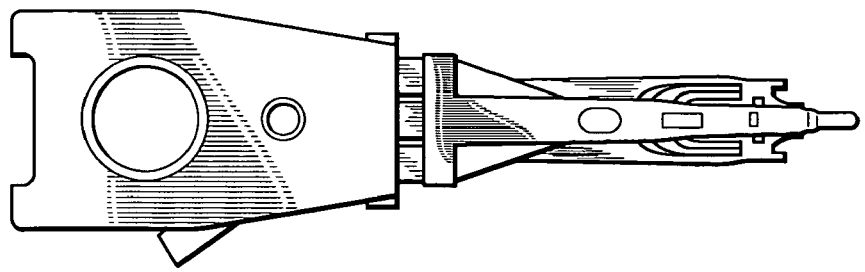
FIG. 24 is a plan view showing an example 1 of a head suspension according to the first embodiment of the present invention having a thin and narrow rigid part and a reinforcing part.
Figure 25:
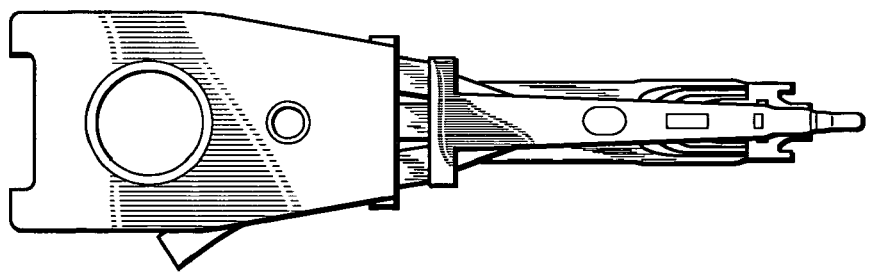
FIG. 25 is a plan view showing a comparative example 1 of a head suspension having a thin rigid part without a reinforcing part.
Figure 26:
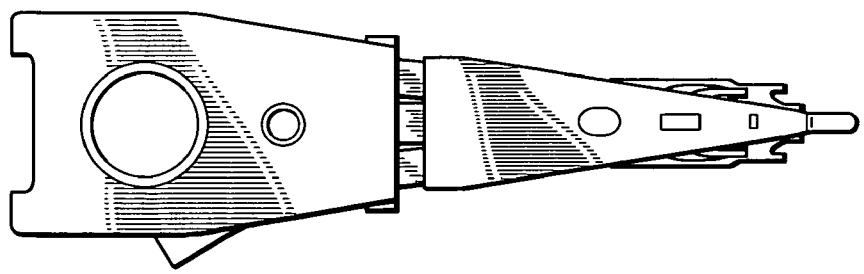
FIG. 26 is a plan view showing a comparative example 2 of a head suspension having a wide rigid part.

FIG. 24 is a plan view showing an example 1 of a head suspension according to the first embodiment of the present invention, FIG. 25 is a plan view showing a comparative example 1 of a head suspension having a narrow rigid part without reinforcing parts, and FIG. 26 is a plan view showing a comparative example 2 of a head suspension having a thick and wide rigid part. The example 1 and comparative examples 1 and 2 are compared with one another. Each of the Example and Comparative Examples is set such that its distance from a boss to a dimple is 11 mm, the length of the load beam is 6.25 mm, and the thickness thereof is 38 µm, and the thickness of the resilient part is 30 µm.

Figure 27:
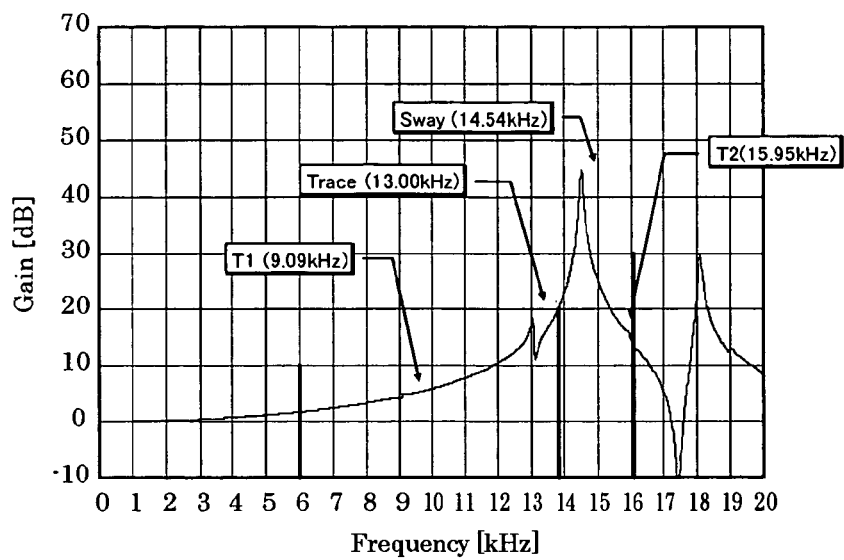
FIG. 27 is a graph showing a relationship between frequency and gain of the example of the head suspension of FIG. 24.
Figure 28:
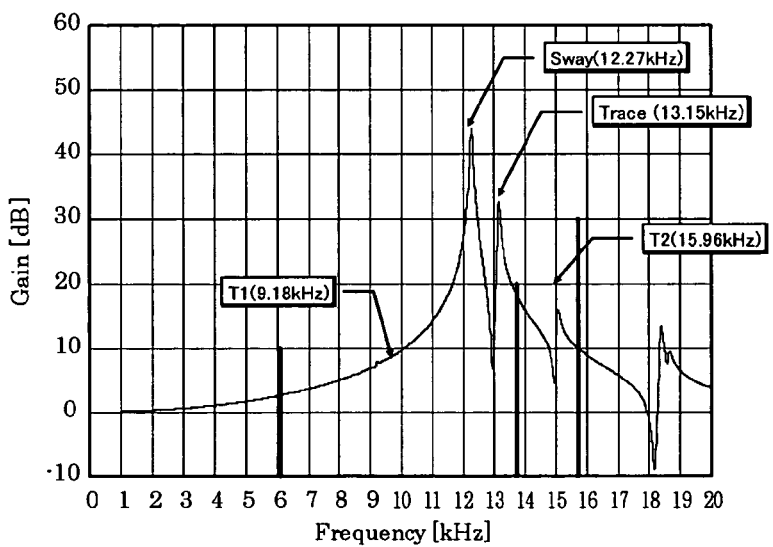
FIG. 28 is a graph showing a relationship between frequency and gain of the comparative example 1 of the head suspension of FIG. 25.
Figure 29:
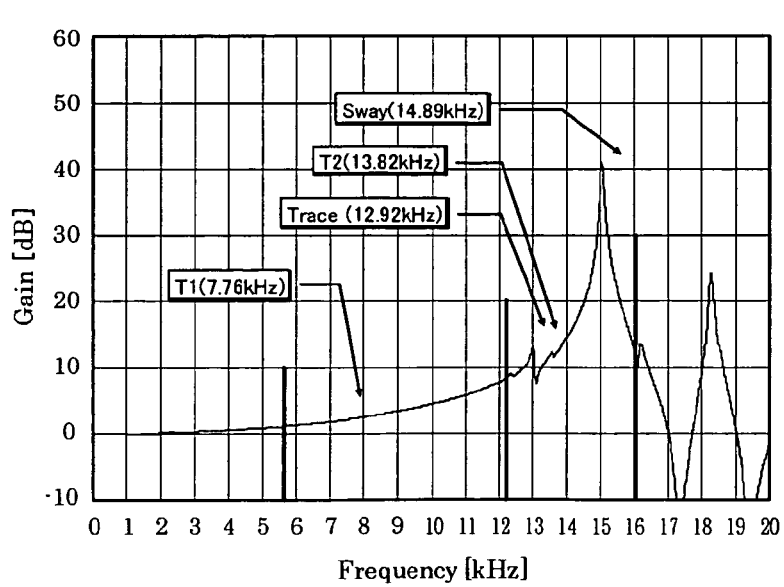
FIG. 29 is a graph showing a relationship between frequency and gain of the comparative example 2 of the head suspension of FIG. 26.

FIGS. 27 to 29 are graphs each showing relationship between a frequency and a gain, in which FIG. 27 is a result of example 1, FIG. 28 is a result of comparative example 1, and FIG. 29 is a result of comparative example 2.

Figures 30, 31, 32:
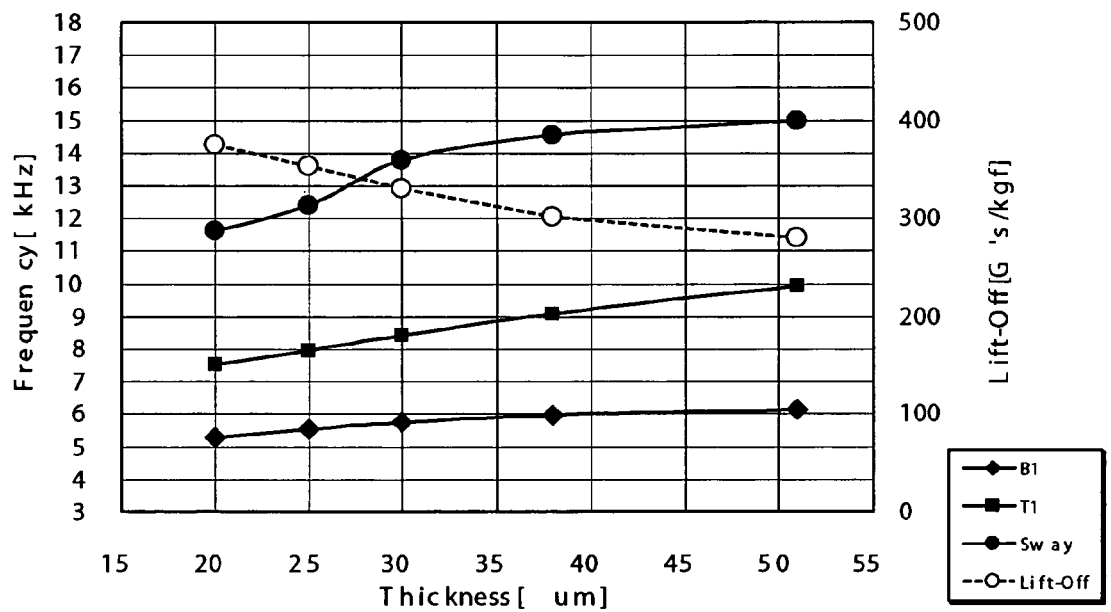
FIG. 30 is a list showing a relationship among B1 frequency, T1 frequency, sway frequency, sway rigidity, and G-lift-off the results regarding the head suspensions of example of FIG. 24, comparative Example 1 of FIG. 25, and comparative Example 2 of FIG. 26.
FIG. 31 is a graph plotted from the values obtained from head suspensions according to the first embodiment having different thicknesses.
FIG. 32 is a list based on the graph of FIG. 31.

FIG. 30 is a list showing a relationship among values of the B1 frequency, the T1 frequency, the sway frequency, the sway rigidity, and the G-lift-off regarding example 1, comparative example 1, and comparative example 2.

The B1 frequencies of example 1 and comparative example 1 are not so different from each other such that they are 5.99 kHz and 6.08 kHz, because they have high longitudinal rigidities and are light in weight. However, comparative example 2 is thick and heavy in weight, so that the B1 frequency thereof lowers to 5.61 kHz.

The T1 frequency of example 1 and comparative example 1 are not so different from each other such that they are 9.09 kHz and 9.18 kHz, because they have high longitudinal rigidities and are light in weight. However, comparative example 2 is thick and have large inertia, so that the T1 frequency thereof lowers to 7.76 kHz.

The sway frequency of example 1 and comparative example 2 are not so different from each other such that they are 14.54 kHz and 14.89 kHz, because they have high rigidities in the sway direction. On the other hand, the comparative example 1 has low rigidity in the swaying direction, so that the sway frequency thereof lowers to 12.27 kHz.

The STA of example 1 and comparative example 1 are as low as $2.31 \times 10^{-5}$ and $1.53 \times 10^{-5}$ due to the narrow rigid part, but the STA of comparative example 2 become as high as $3.23 \times 10^{-5}$ to deteriorate due to the wide rigid part.

The sway rigidity which is the lateral rigidity when the dimple is pressed of example 1 is 19920.21N/m, comparative example 2 is 19997.62N/m, and comparative example 1 is as low as 14502.67N/m.

The G-lift-off of example 1 and comparative example 1 are as high as 302.38G/gf and 311.86G/gf due to light weight, but that of comparative example 2 is as low as 246.19G/gf.

Thus, according to the structure of example 1 as the first embodiment of the present invention, the shock property and the T1 windage can be simultaneously improved and the T1 frequency, the B1 frequency, and the sway frequency can be made high by making the rigid part 11 narrow and light and securing the rigidity of the load beam 3.

FIG. 31 is a graph showing the result obtained from head suspensions according to the first embodiment having different thicknesses of 20, 25, 30, 38, and 51 µm, FIG. 32 is a list based on the graph of FIG. 31. In the head suspensions, a distance from the center of the boss 51 to the center of the dimple 35, the length of the load beam 3, and the thickness of the resilient part 13 are set to 11 mm, 6.25 mm, and 30 µm, respectively.

As shown in FIGS. 31 and 32, the load beam become heavier according to increase in thickness thereof, the G-lift-off is lowered. In this case, the B1 frequency, the T1 frequency, and the sway frequency are increased due to increase in rigidity.

In the 1-inch hard disk drive or the like, the T1 windage is disregardable, so that the G-lift-off can be improved by further thinning to reduce weight.

Such a head suspension may be also applied to a large size processing apparatus such as a desktop computer.

Figure 33:
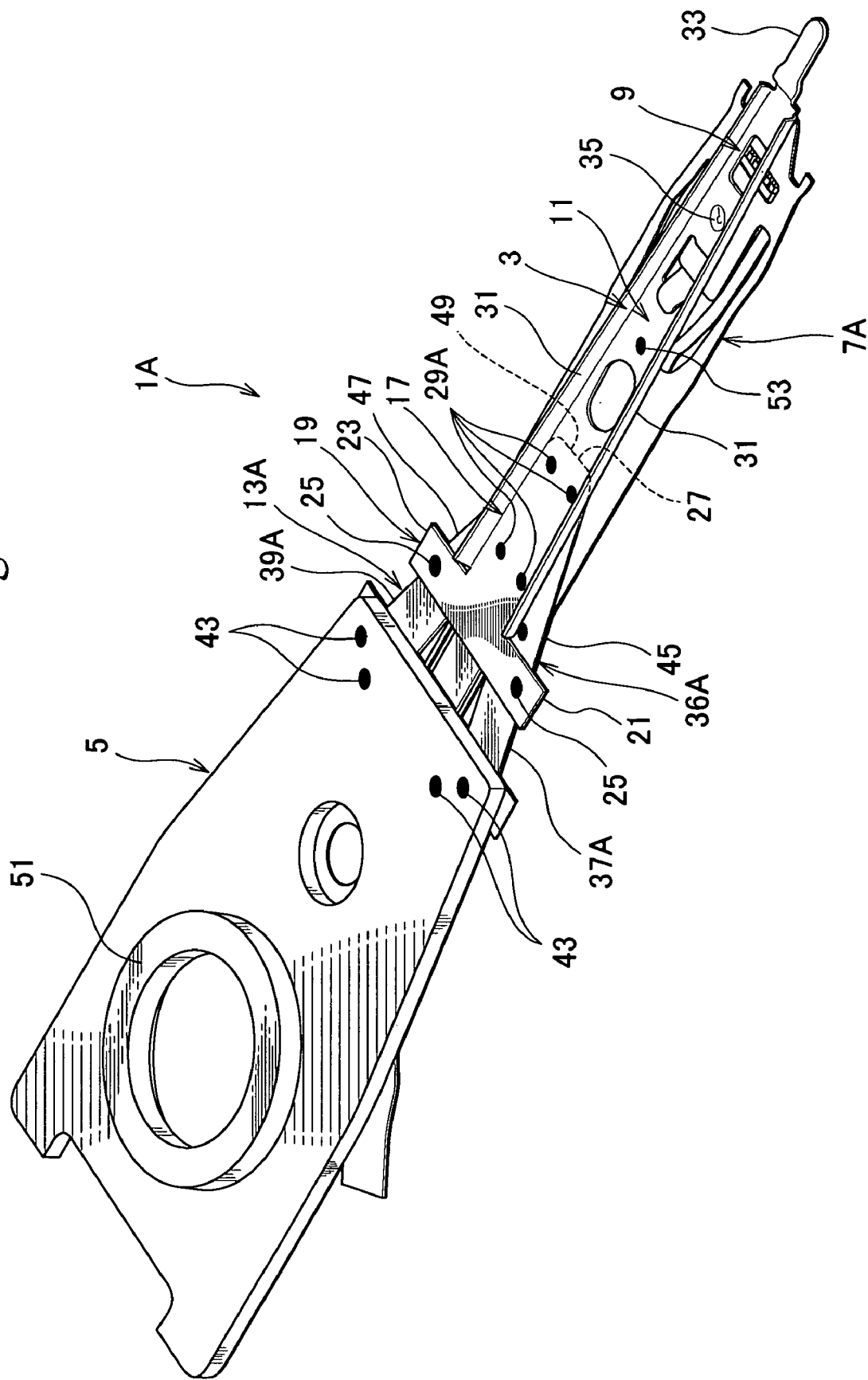
FIG. 33 is a perspective view showing a modification of the head suspension according to a the first embodiment of the present invention on an opposite-to-disk side.
Figure 34:
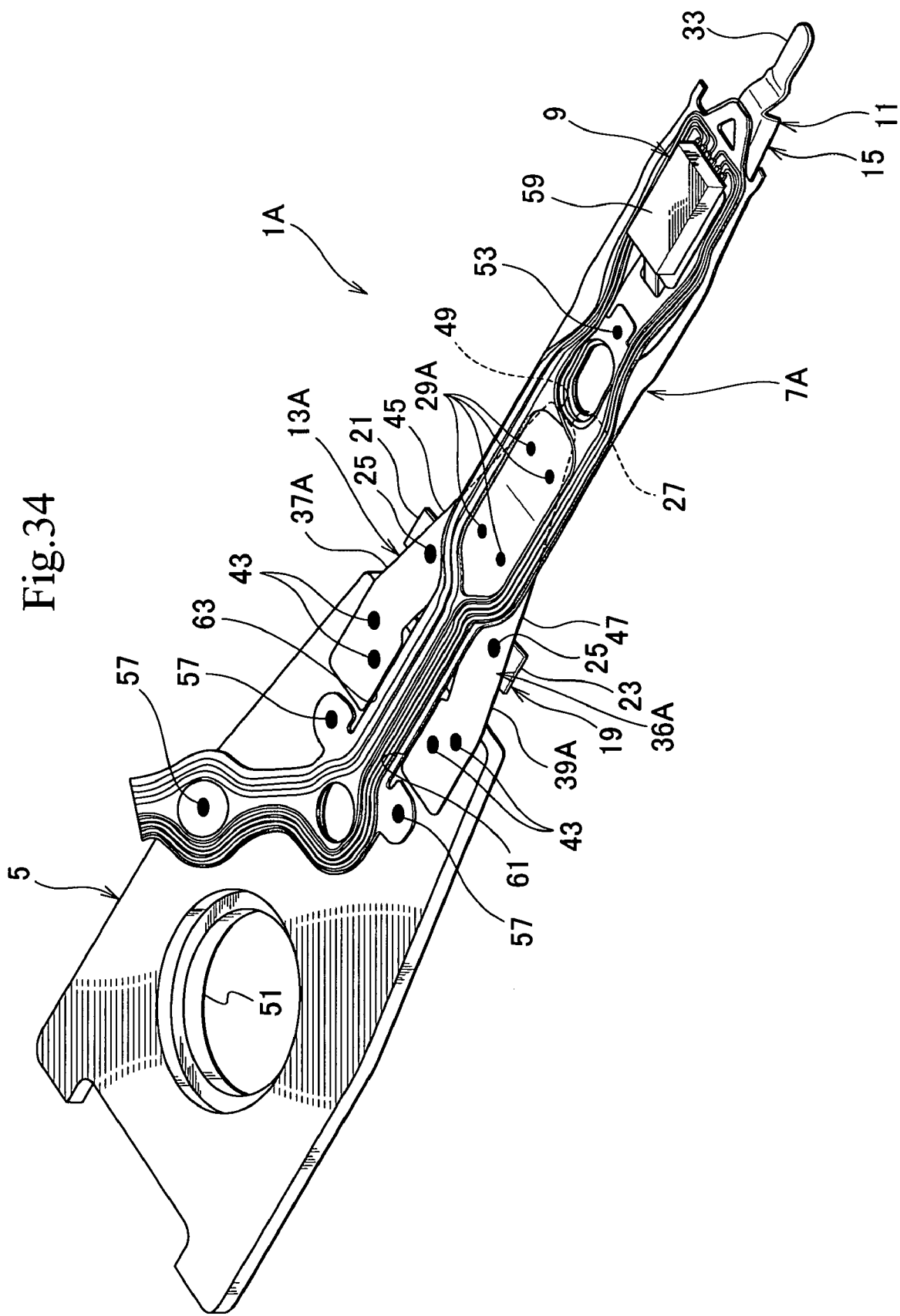
FIG. 34 is a perspective view showing the head suspension of FIG. 33 on a disk side.

FIGS. 33 and 34 show a head suspension according to a modification of the first embodiment of the present invention, in which FIG. 33 is a perspective view showing the head suspension on the opposite-to-disk side, and FIG. 34 is a perspective view thereof on the disk side. The structure of the modification is basically the same as that of the first embodiment, and therefore, the same or corresponding parts are represented with the same reference numerals or the same reference numerals plus "A."

According to the head suspension 1A of the modification, the resilient member 36A and a flexure 7A have shapes slightly changed from those in the first embodiment.

The resilient member 36A is provided at a second end with bifurcated branches 37A and 39A. The branches 37A and 39A have inner side edges 61 and 63 opposite to each other in the across-the-width direction of the load beam 3, respectively. The inner side edges 61 and 63 of the branches 37A and 39A protrude toward the flexure 7A in the across-the-width direction.

The flexure 7A is welded by welded spots 29A between the rigid part 11 and the extension 27.

According to the modification, reinforcing parts 45 and 47 is provided on the extension 27 of the resilient member 36A, so that approximately similar function and advantage to those of the first embodiment can be achieved.

Additionally, the flexure 7A can be reliably fixed to the resilient member 36A via the extension 27, so that it can securely prevent the flexure 7A from fluttering.

Method for manufacturing head suspension will be explained with reference to FIGS. 35 to 43.

Figure 35:
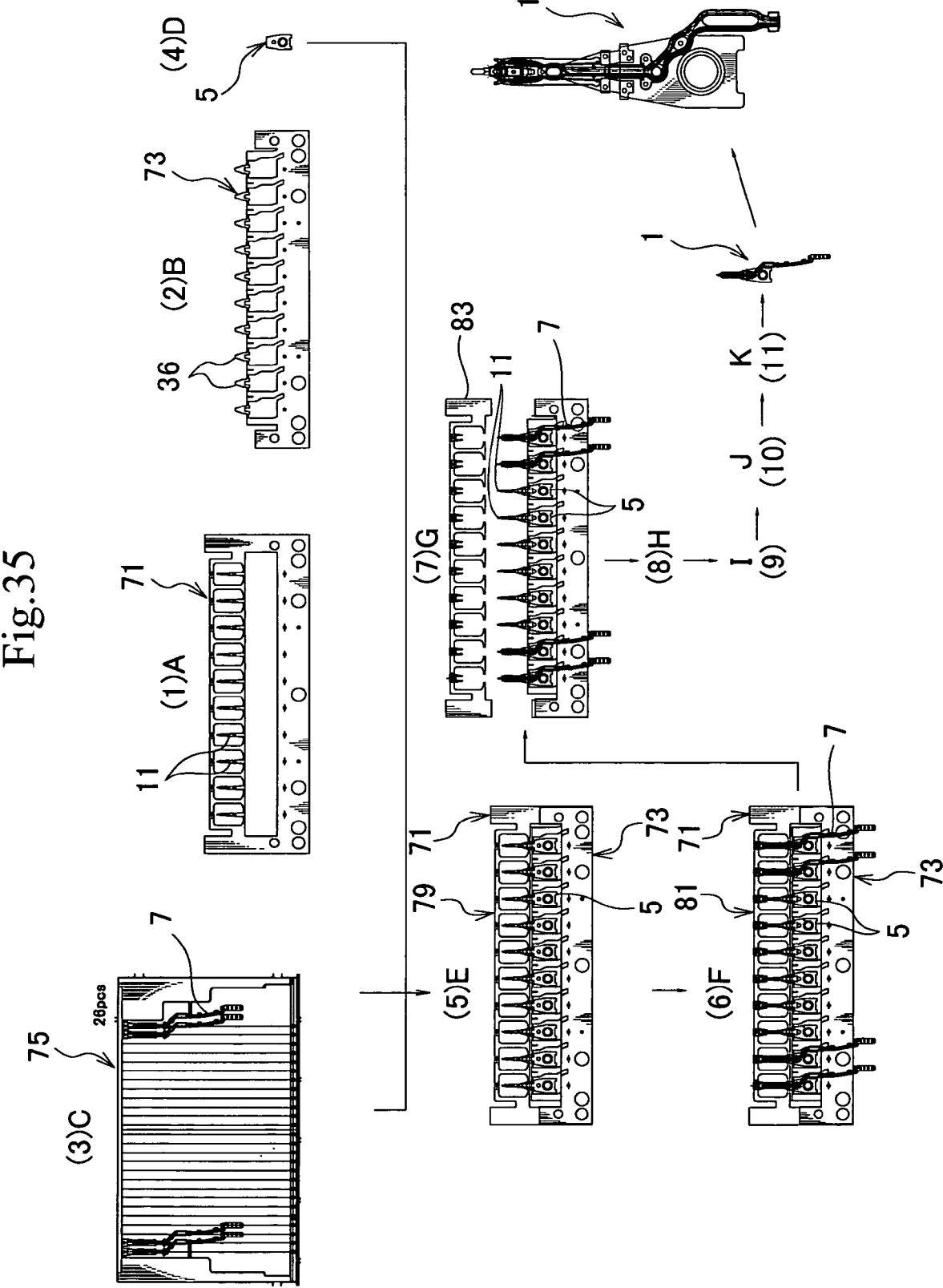
FIG. 35 is a plan view corresponding to manufacturing steps for realizing a method for manufacturing the head suspension according to the first embodiment.
Figure 36:
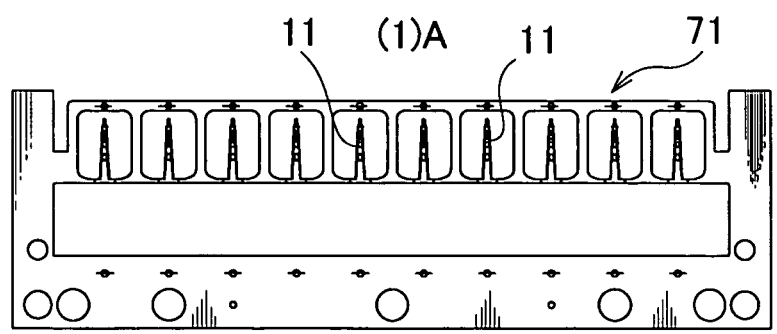
FIG. 36 is an enlarged plan view showing a rigid part chain product of FIG. 35.
Figure 39:
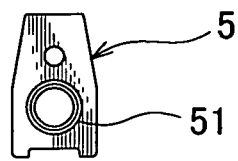
FIG. 39 is an enlarged plan view of a base plate of FIG. 35.
Figure 40:
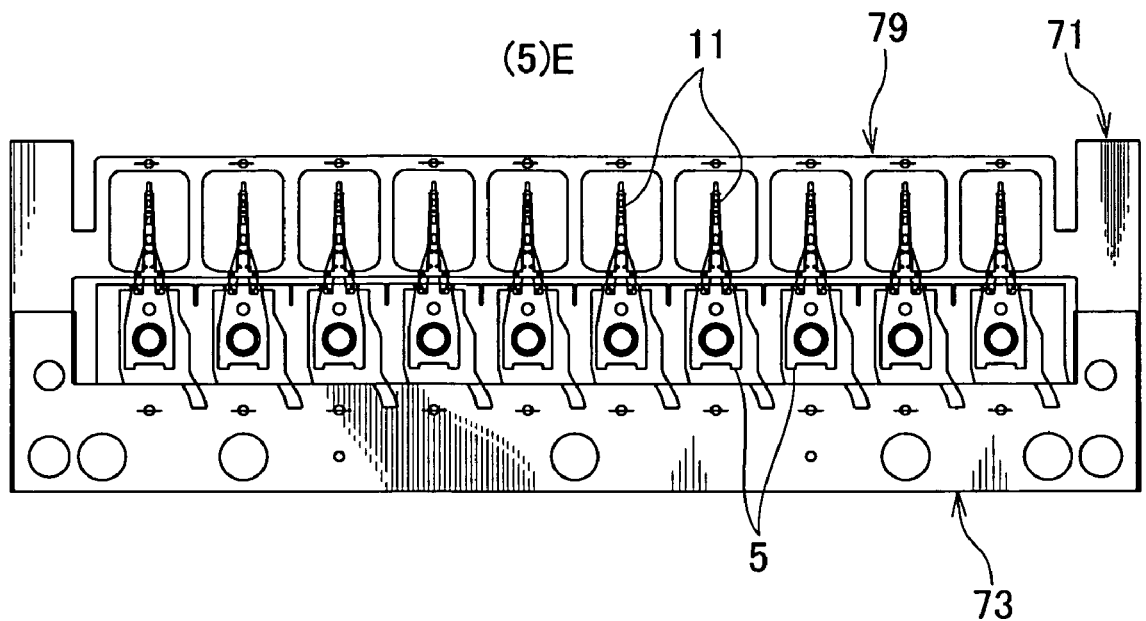
FIG. 40 is a an enlarged plan view showing a semi-stacked set of FIG. 35.
Figure 41:
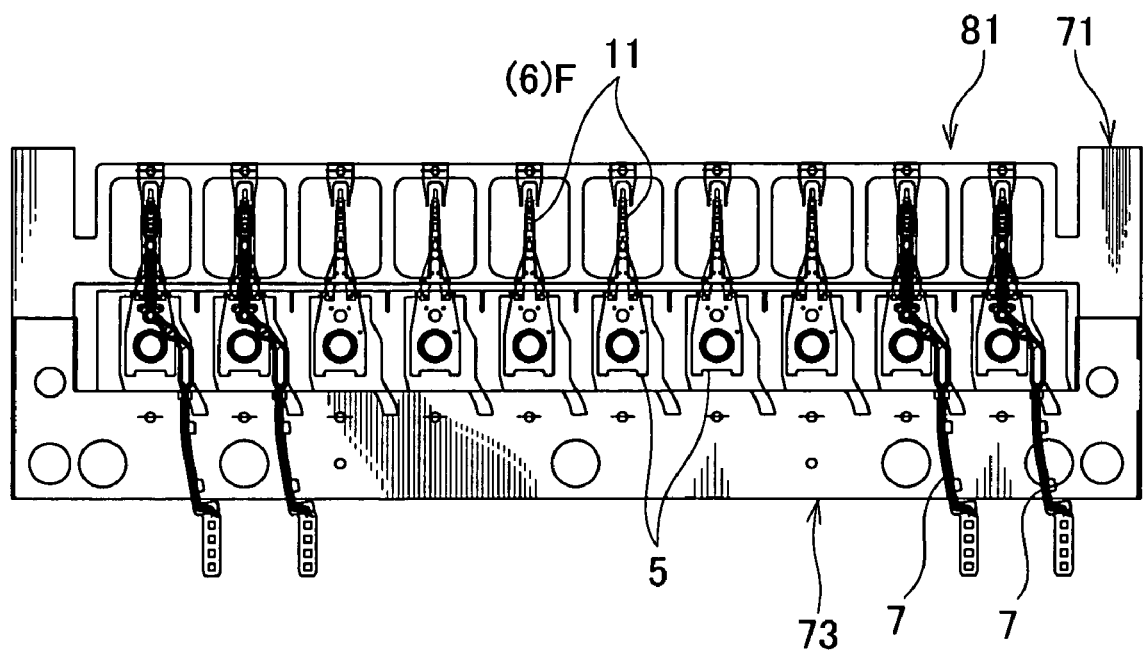
FIG. 41 is a an enlarged plan view showing a stacked set of FIG. 35.
Figure 42:
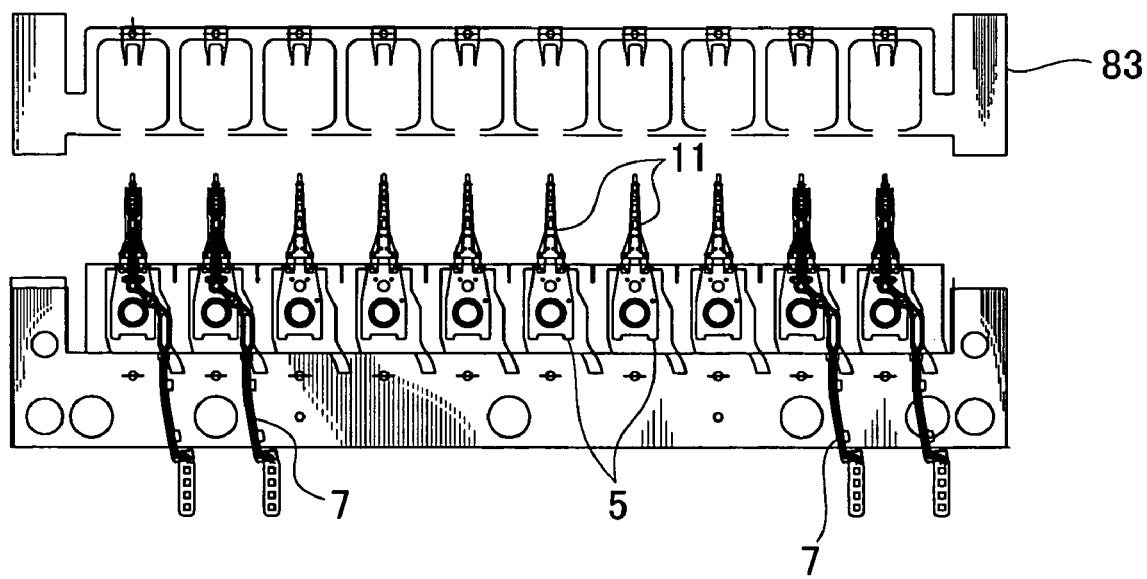
FIG. 42 is an enlarged view showing a first cutting step of FIG. 35.
Figure 43:
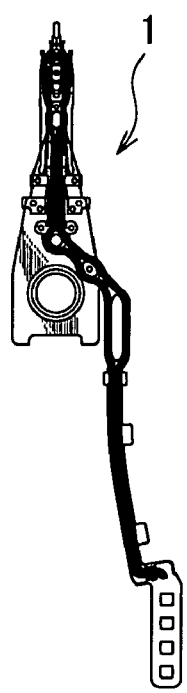
FIG. 43 is an enlarged view showing a head suspension after cut of FIG. 35.

FIG. 35 is a plan view corresponding to manufacturing steps for realizing a method for manufacturing a head suspension according to the first embodiment of the present invention. FIG. 36 is an enlarged plan view showing a rigid part chain product of FIG. 35, FIG. 37 is an enlarged plan view showing a resilient part chain product of FIG. 35, FIG. 38 is an enlarged plan view showing a flexure chain product of FIG. 35, FIG. 39 is an enlarged plan view showing a base plate of FIG. 35, FIG. 40 is an enlarged plan view showing a semi-stacked set of FIG. 35, FIG. 41 is an enlarged plan view showing a stacked set of FIG. 35, FIG. 42 is an enlarged plan view showing a first cutting step of FIG. 35, and FIG. 43 is an enlarged plan view showing a head suspension after cut of FIG. 35.

In FIGS. 35 and 36, a step (1) corresponds to the rigid part chain product manufacturing step A. In the step A, a rigid part chain product 71 including rigid parts 11 continuously provided side by side is formed. On each rigid part 11, the dimple 35, the tab 33, the rail portions 31, and the like are formed by, for example, press.

Figure 37:
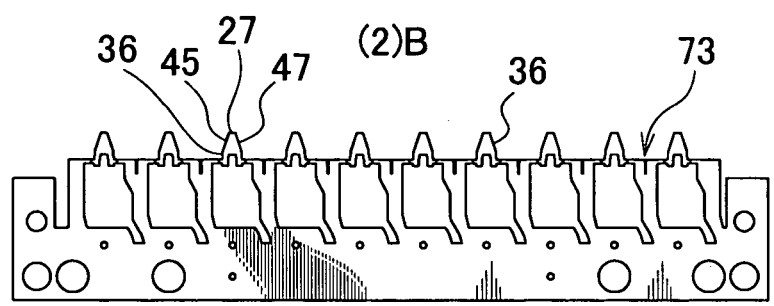
FIG. 37 is an enlarged plan view showing a resilient part chain product of FIG. 35.

In FIGS. 35 and 37, a step (2) corresponds to a resilient part chain product manufacturing step B included in a resilient member manufacturing step. In the step B, a resilient part chain product 73 including resilient members 36, each composing the resilient part 13, continuously provided side by side is formed. Each resilient member 36 of the resilient part chain product 73 includes the extension portion 27 integrated with the reinforcing parts 45 and 47 formed in the triangle wing shape on both side thereof. Each resilient member 36 of the resilient part chain product 73 is cut and separated from the resilient part chain product 73 as described later.

Figure 38:
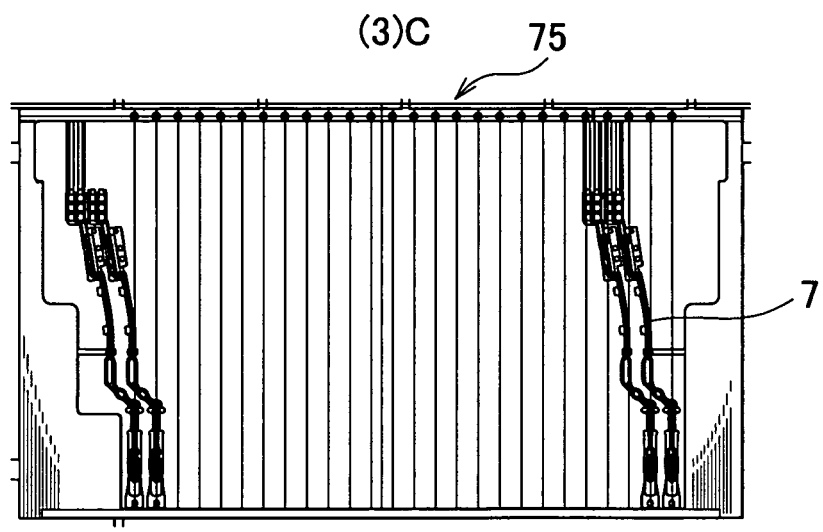
FIG. 38 is an enlarged plan view showing a flexure chain product of FIG. 35.

In FIGS. 35 and 38, a step (3) corresponds to a flexure manufacturing step C. In the step C, a flexure chain product 75 including flexures 7 continuously provided side by side is formed. Each flexure 7 of the flexure chain product 75 is processed to be cut a thin plate. On the flexure, wiring patterns are formed on the cut thin plate, an outrigger is formed, and the like.

In FIGS. 35 and 39, a step (4) corresponds to a base manufacturing step D. In the step D, the base plates 5 as bases are formed by the required number. On each base plate 5, the boss 51 is formed by, for example, press.

In FIG. 35, steps (5) and (6) correspond to stacking and coupling steps E and F, where the step (5) includes a semi-stacking and welding step E and the step (6) includes a stacking and welding step F.

In FIGS. 35 and 40, in the semi-stacking and welding step E shown as the step (5), the rigid part chain product 71 and the resilient part chain product 73 overlap with each other, the base plates 5 are arranged at an area adjacent to each resilient member 36 of the resilient part chain product 73. Then, proper spots of the rigid part chain product 71, the resilient part chain product 73, and the base plates 5 are laser-welded or the like to form a semi-stacked set 79.

In FIGS. 35 and 41, in the stacking and welding step F shown as the step (6), flexures 7 are respectively cut from the flexure chain product 75, and the respective flexures 7 are stacked on the semi-stacked set 79 at predetermined positions. Positioning of the respective flexures 7 to the semi-stacked set 79 is performed using positioning tabs. The stacked flexures 7 is welded to the semi-stacked set 79 by, for example, laser welding to from a stacked set 81.

In FIGS. 35 and 42, a step (7) corresponds to a first cutting step G. In the step G shown as a step (7), a half 83 of the frame coupled to the rigid parts 11 are cut from the stacked set 81 and the positioning tabs of the respective flexures 7 are cut off.

In FIG. 35, a step (8) corresponds to a cleaning step H, where a semi-product after the first cutting step G is cleaned. A step (9) corresponds to a short check step I, where the cleaned semi-product is checked or tested electrically. A step (10) corresponds to a GL step J measuring bending load and preventing permanent set in fatigue due to application of overload. A step (11) corresponds to a second cutting step K cutting to obtain individual head suspensions 1 as final products from a remaining half of the frame as shown in FIGS. 35 and 43. The second cutting step K and the first cutting step G constitute a cutting step of cutting and separating the respective head suspensions 1 from the stacked set 81.

According to such a manufacturing method, head suspensions 1 can be provided smoothly and reliably.

In addition, the head suspension 1 having the reinforcing parts 45 and 47 connecting and bridging the both protrusions 21 and 23 of the joint 19 and the rigid part 11 can be manufactured easily without a special step.

The head suspension 1A can also be manufactured according to similar steps.

Second Embodiment

Figure 44:
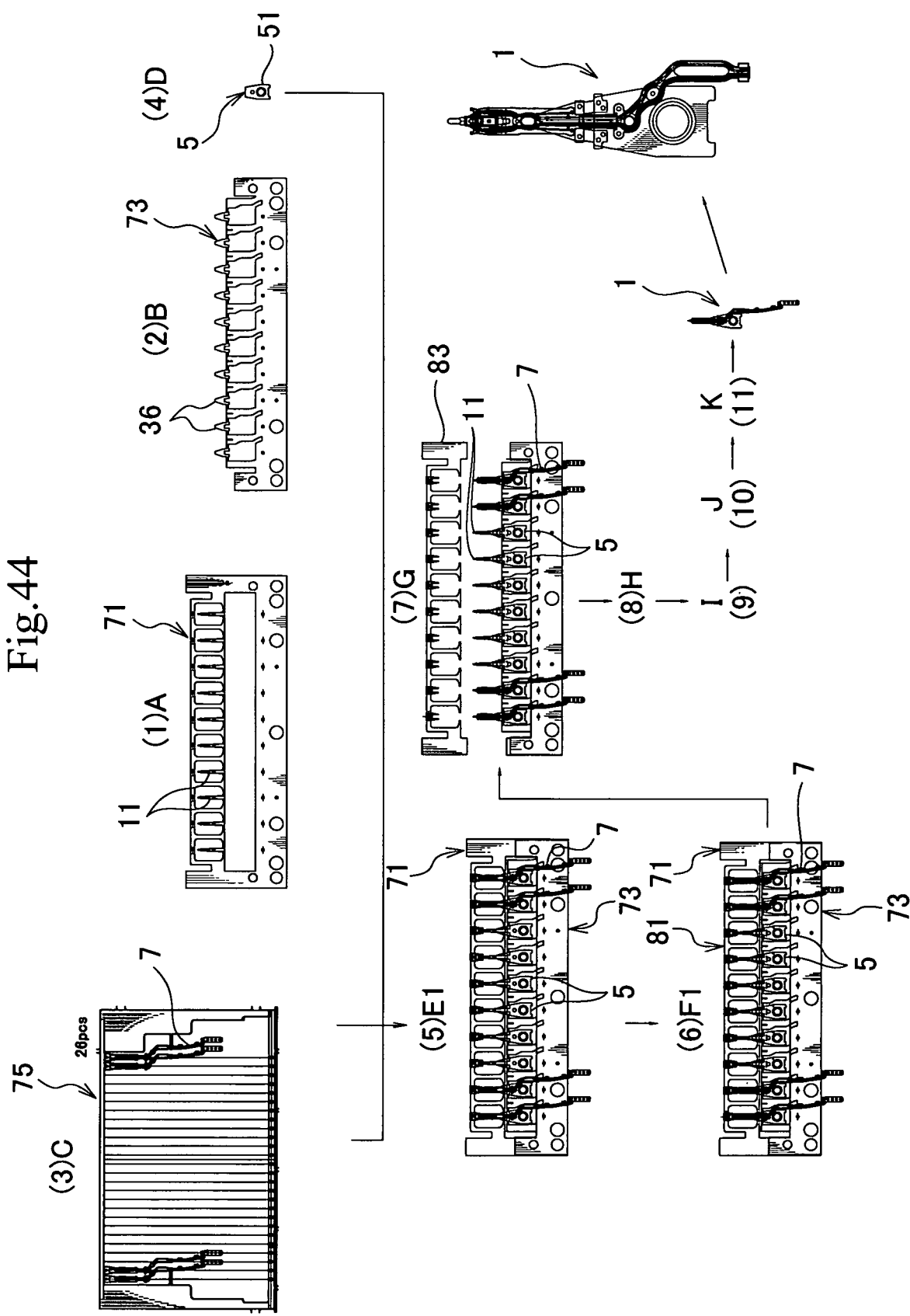
FIG. 44 is a plan view corresponding to manufacturing steps for realizing a method for manufacturing a head suspension according to a second embodiment of the present invention.

A second embodiment of the present invention will be explained with reference with FIG. 44. FIG. 44 is a plan view corresponding to manufacturing steps for realizing a method for manufacturing a head suspension according to the second embodiment of the present invention. The manufacturing steps of the second embodiment are basically the same as those of the first embodiment, and therefore, the same or corresponding parts are represented with the same reference numerals of FIG. 35.

In the manufacturing method of the second embodiment, stacking and coupling steps E1 and F1 are adopted instead of stacking and coupling steps E and F of the first embodiment. In FIG. 44, a step (5) corresponds to a stacking step E1 and a step (6) corresponds to a welding step F1.

In the stacking step E1 shown as step (5), the rigid part chain product 71, the resilient part chain product 73, respective base plates, and respective flexures 7 are stacked and positioned in a proper relationship. The flexures 7 are respectively cut from the flexure chain product 75 like the above manner.

After the stacking step E1, a stacked set 81 is formed by, for example, laser-welding respective spots in the welding step F1 shown as step (6).

The remaining steps are similar to those in the first embodiment.

In the second embodiment, therefore, an operations or effects or advantages similar to those in the first embodiment can be achieved.

Third Embodiment

A third embodiment of the present invention will be explained with reference with FIGS. 46 to 48.

Figure 45:
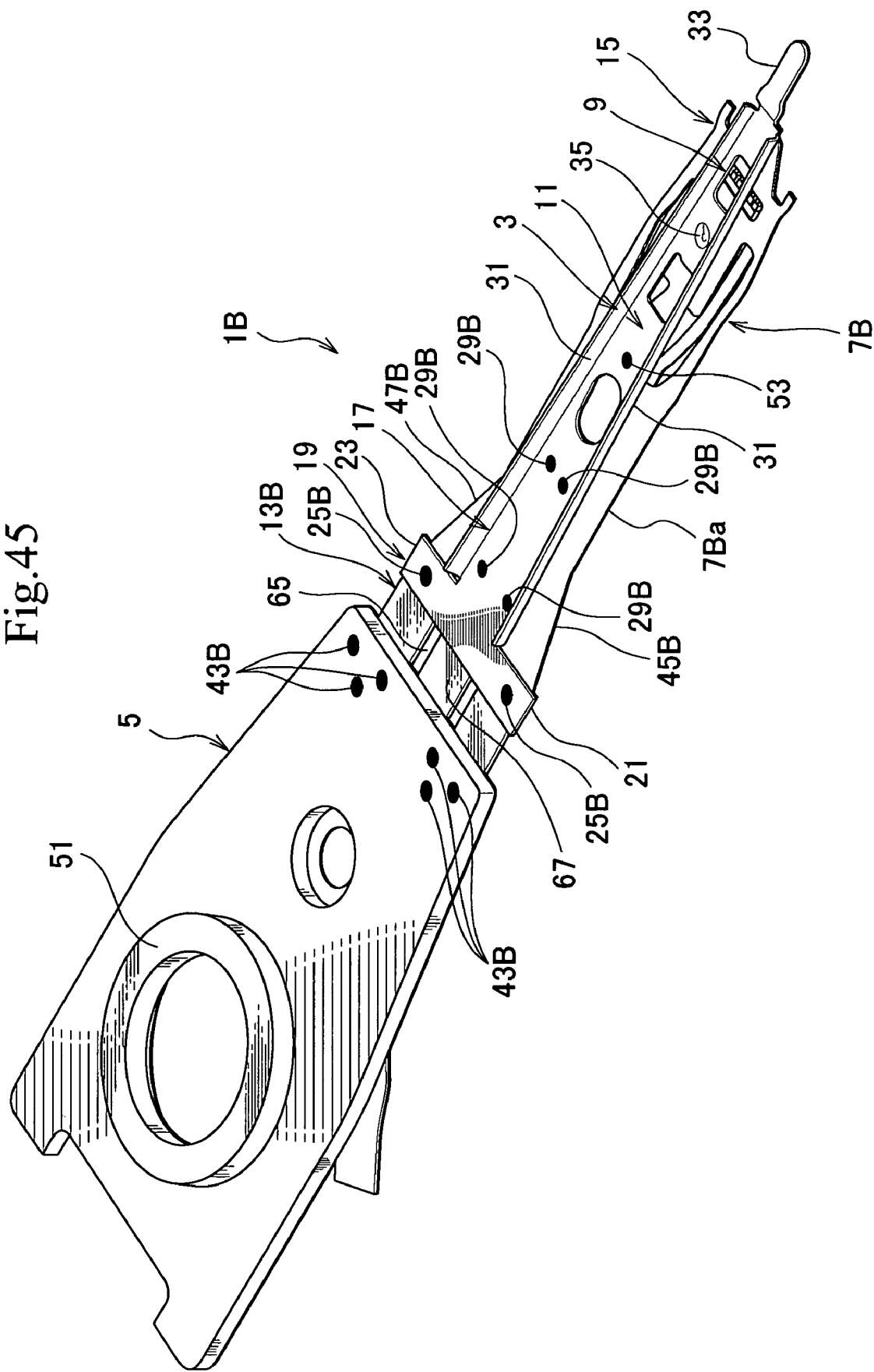
FIG. 45 is a perspective view showing a head suspension according to a third embodiment of the present invention on an opposite-to-disk side.
Figure 46:
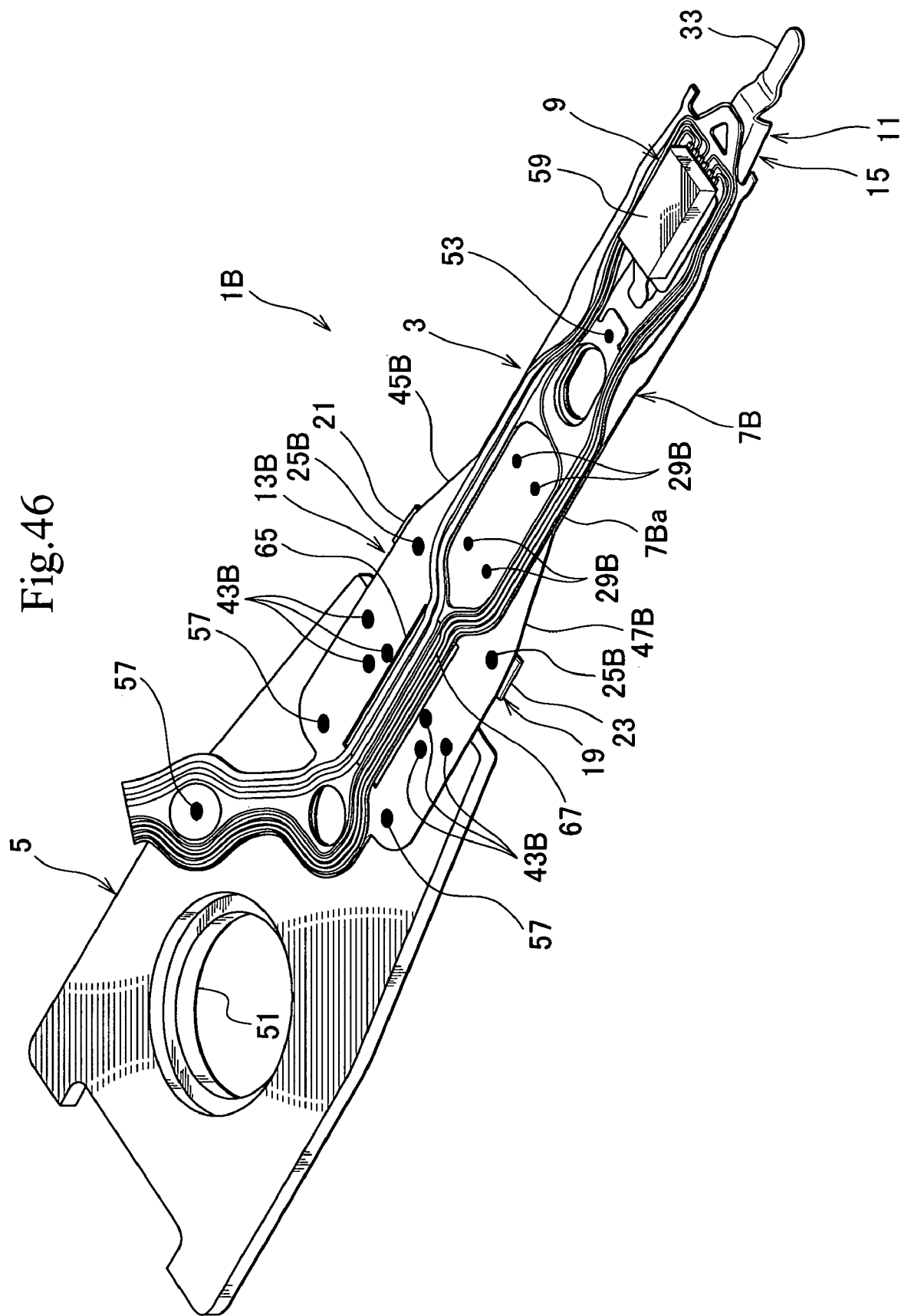
FIG. 46 is a perspective view showing the head suspension of FIG. 45 on a disk side.

FIGS. 45 and 46 show a head suspension according to a third embodiment of the present invention, in which FIG. 45 is a perspective view showing the head suspension on the opposite-to-disk side, and FIG. 46 is a perspective view thereof on a disk side. The structure of the third embodiment is basically the same as that of the first embodiment, and therefore, the same or corresponding parts are represented with the same reference numerals or the same reference numerals plus "B."

According to the head suspension 1B of the third embodiment, a resilient part 13B is integrated with a thin plate 7Ba made of, for example, a thin stainless steel rolled plate (SST) having a spring or resilient property of the flexure 7B. Namely, the resilient part 13B is formed on both sides defined by a hole 85 formed in the thin plate 7Ba. The hole 85 is arranged under and in correspondence with read/write wiring patterns 67 including an insulating layer. Therefore, the hole 85 substantially has the same width as the wiring patterns 67 and is lengthy extend from a portion positioned on the base plate 5 to a portion positioned on the joint 19. Reinforcing parts 45B and 47B is also integrated with the thin plate 7Ba. According to the third embodiment, the reinforcing parts 45B and 47B have a trapezoidal wing shape instead of the triangular wing shape of the reinforcing parts 45 and 47 of the first embodiment. The flexure 7B is welded to the joint 19 of the rigid part 11 at welded spots 25B, is welded to the rigid part 11 at welded spots 29B, is welded to the base plate 5 at welded spot 43B, and is welded at other portions similarly.

According to the third embodiment, function and advantage similar to those in the first embodiment can be achieved due to the reinforcing parts 45B and 47B. In addition, the resilient part 13B and the reinforcing parts 45B and 47B are integrated with the flexure 7B. Therefore, the number of parts is considerably reduced, and parts assembling and pats management are remarkably made easy.

A manufacturing method of the head suspension will be explained.

Figure 47:
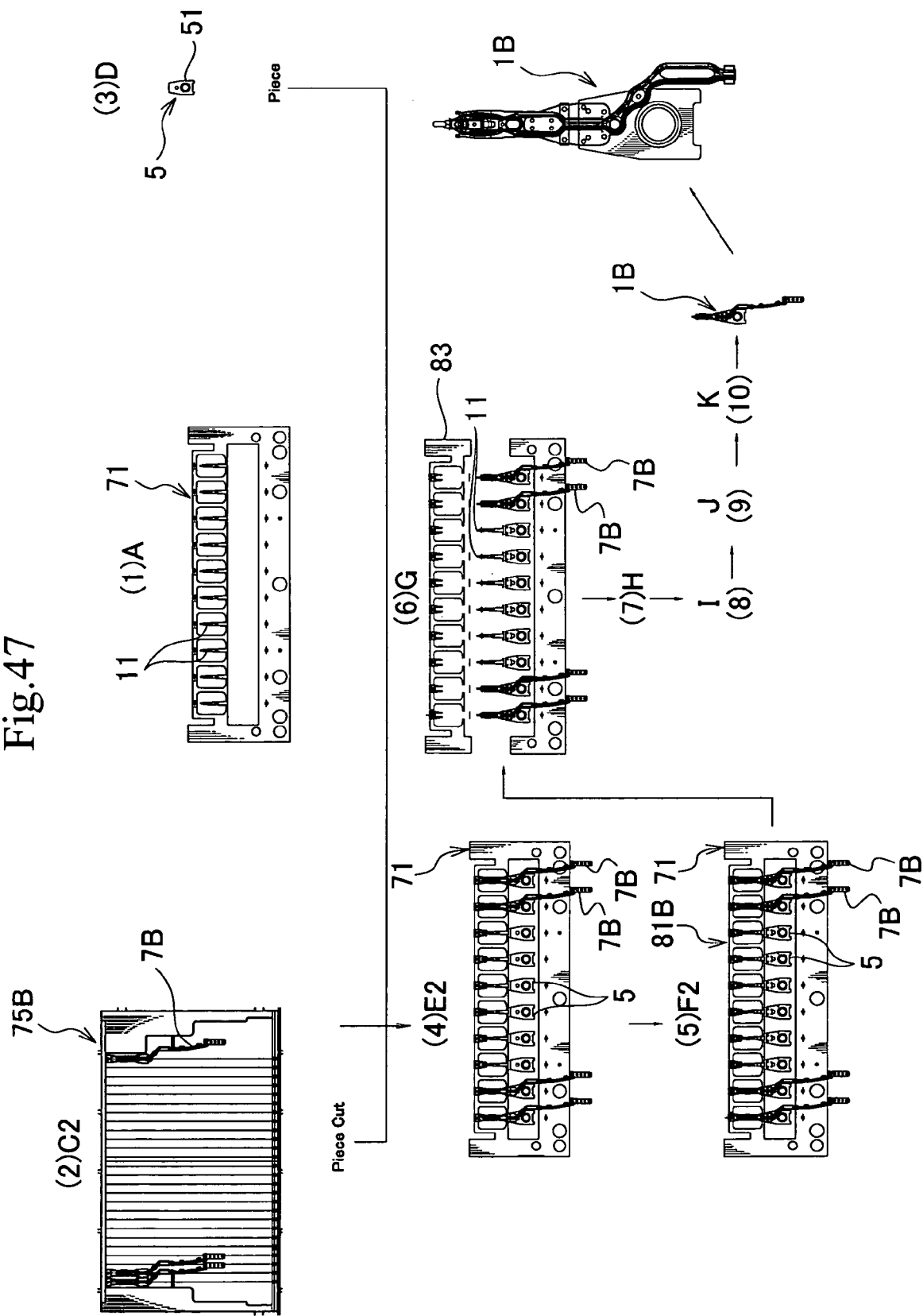
FIG. 47 is a plan view corresponding to manufacturing steps for realizing a method for manufacturing the head suspension of the third embodiment.

FIG. 47 is a plan view showing manufacturing steps for realizing method for manufacturing a head suspension according to a third embodiment of the present invention. FIG. 48 is a plan view showing a flexure of FIG. 47. The manufacturing steps of the third embodiment are basically the same as those of the second embodiment, and therefore, the same or corresponding parts are represented with the same reference numerals of FIG. 35 or the same reference numerals plus "B."

In the manufacturing method of the third embodiment, the resilient part 13B is integrated with the flexure 7B, i.e., is formed as a part of the flexure 7B. Therefore, a step corresponding to the resilient part chain product manufacturing step B shown in FIG. 44 can be omitted. Namely, the manufacturing method of the third embodiment comprises the rigid part chain product manufacturing step A shown as (1), the flexure manufacturing step C2 shown as (2), the base manufacturing step D shown as (3), the stacking and coupling step including the stacking step E2 shown as (4) and the welding step F2 shown as (5), the first cutting step G shown as (6), the cleaning step H shown as (7), the short check step I shown as (8), the GL step J shown as (9), and the second cutting step K shown as (10).

Figure 48:
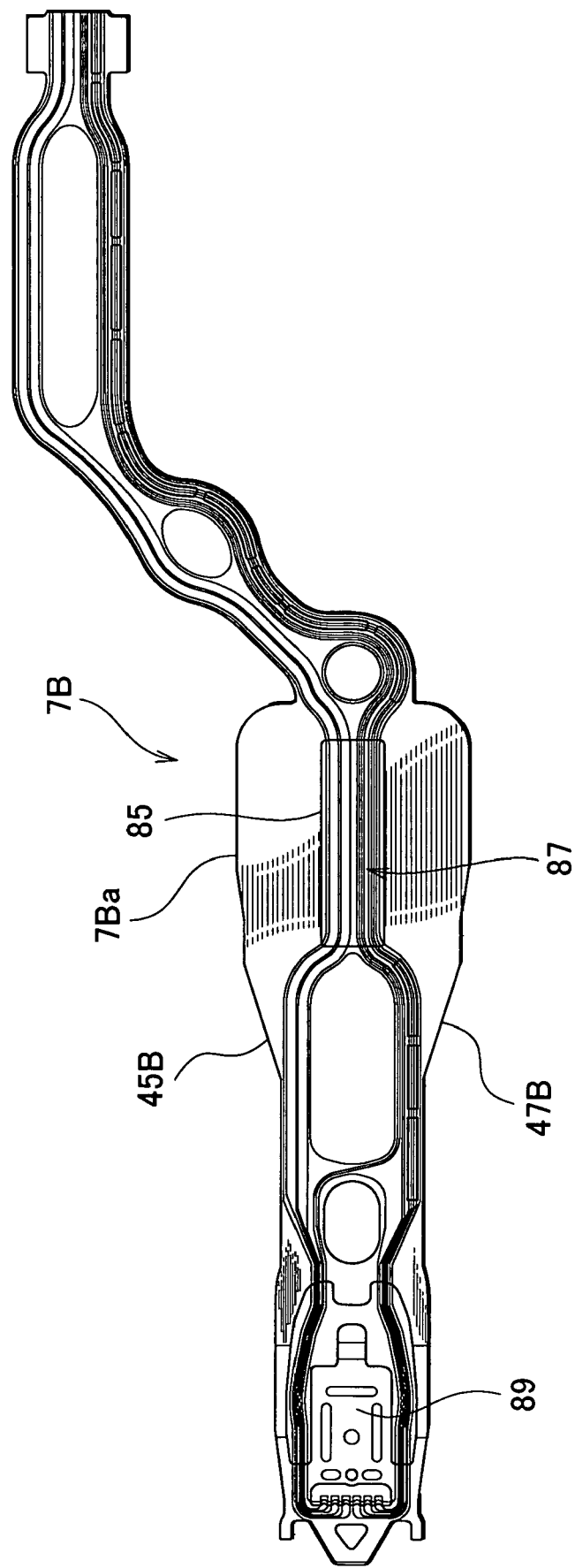
FIG. 48 is a perspective view showing a flexure of FIG. 47.
Figure 49:
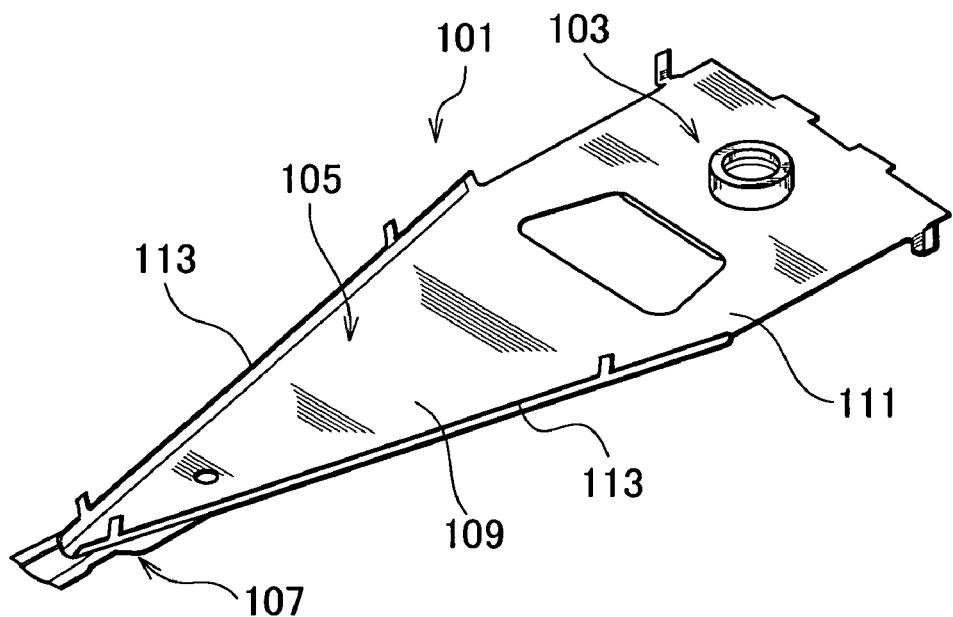
FIG. 49 is a plan view showing a head suspension according to a related art.

According to the third embodiment, in the flexure manufacturing step C2, as shown in FIGS. 47 and 48, the reinforcing parts 45B and 47B are integrally formed on a thin plate 7Ba of the flexure 7B. The thin plate 7Ba is further formed with a hole 85, a tongue 89, and the like, and wiring patterns 87 formed on the thin plate 7Ba. In the flexure manufacturing step C2, a flexure chain product 75B having the flexures 7B continuously provided side by side is formed in this manner.

In the stacking step E2, the rigid part chain product 71, respective base plates 5, and respective flexure 7B are stacked and positioned. The flexures 7B are cut from a flexure chain product 75 like the above in advance.

After the stacking step E2, a stacked set 81B is formed by welding respective portions by, for example, laser welding in the welding step F2.

The remaining steps are similar to those in the first embodiment.

In the third embodiment, therefore, an operations, effects, or advantages similar to those in the first embodiment can be achieved.

According the third embodiment, the resilient part chain product manufacturing step B can be omitted, so that manufacturing of head suspensions can be made simpler. Further, the cutting step can be simplified.

What is claimed is:

1. A method of manufacturing a head suspension of a hard disk drive, the head suspension including a base to be attached to a carriage of the hard disk drive and turned around a spindle, a load beam including a rigid part and a resilient part separated from the rigid part to apply load onto a head that is arranged at a front end of the load beam to write and read data to and from a disk arranged in the hard disk drive, the rigid part extending from a front end to a base end part thereof, said base end being connected to the resilient part that is supported with the base, a flexure having read/write wiring patterns connected to the head, the flexure supporting the head and being attached to the load beam, a joint provided on the base end of the rigid part and having a protrusion that extends and protrudes from each side of the base end of the rigid part laterally, the joint being connected to the resilient part, and reinforcing parts each expanding and connecting between each of the protrusions and a middle portion of the rigid part between the front end and the base end thereof, the method including:
   forming a resilient member comprising the resilient part separately from the rigid part, the resilient member integrally including a branch portion extending between the joint of the rigid part and the base, an extension extending from the branch portion so as to overlap with the middle portion of the rigid part, and a reinforcing part formed on each side of the extension;
   connecting a first end of the branch portion, a second end of which is connected to the base, to the joint of the rigid part; and
   connecting the extension on the middle portion of the rigid part, to dispose the reinforcing parts between the protrusions and the middle portion of the rigid part, respectively.

2. A method of manufacturing a head suspension of a hard disk drive, the head suspension that comprises a base to be attached to a carriage of the hard disk drive and turned around a spindle, a load beam including a rigid part and a resilient part separated from the rigid part, to apply load onto a head that is arranged at a front end of the load beam to write and read data to and from a disk arranged in the hard disk drive, a base end of the rigid part being connected to the resilient part that is supported with the base, a flexure having read/write wiring patterns connected to the head, the flexure supporting the head and attached to the load beam, a joint provided on the rigid part, to be connected to the resilient part, a protrusion formed on each side edge, and reinforcing parts each expanding and connecting between each of the protrusions and the rigid part, the method comprising:
   a rigid part chain product manufacturing step forming a rigid part chain product where rigid parts are provided continuously;
   a resilient part chain product manufacturing step forming a resilient part chain product where resilient members integrated with the reinforcing parts are provided continuously;
   a flexure manufacturing step forming the flexure;
   a base manufacturing step forming the base;
   a stacking and coupling step stacking and coupling the rigid part chain product, the resilient part chain product, the bases, and the flexures, to form a stacked set; and
   a cutting step cutting and separating respective head suspensions from the stacked set.

3. The method of manufacturing a head suspension of claim 2, wherein the stacking and coupling step includes:
   a semi-stacking and welding step stacking and welding the rigid part chain product, the resilient part chain product, and the base, to form a semi-stacked set; and
   a stacking and welding step stacking and welding the flexures to the semi-stacked set to form the stacked set.

4. The method of manufacturing a head suspension of claim 2, wherein the stacking and coupling step includes
   a stacking step stacking the rigid part chain product, the resilient part chain product, the bases, and the flexures, and
   a welding step welding the rigid part chain product, the resilient part chain product, the bases, and the flexures after the stacking step, to form the stacked set.

5. The method of manufacturing a head suspension of claim 2, wherein said rigid part chain product manufacturing step and said resilient part chain product manufacturing step include, respectively, forming said rigid parts and said resilient parts attached to one another side by side on said rigid part chain product and said resilient part chain product.

6. The method of manufacturing a head suspension of claim 5, further comprising forming surface features of the rigid parts by pressing said rigid parts while attached on the rigid part chain product.

7. The method of manufacturing a head suspension of claim 5, wherein said flexure manufacturing step includes forming plural ones of said flexure attached to one another side by side on a flexure chain product.

8. The method of manufacturing a head suspension of claim 5, wherein:
the stacking and coupling step includes a semi-stacking and welding step stacking and welding the rigid part chain product, the resilient part chain product, and the base, to form a semi-stacked set; and
said semi-stacking and welding step includes overlapping the rigid part chain product and the resilient part chain product with each other, arranging the base plates at an area adjacent to each of the resilient members of the resilient part chain product, and welding proper spots of the rigid part chain product, the resilient part chain product and the base plates to form the semi-stacked set.

9. The method of manufacturing a head suspension of claim 8, wherein:
wherein the stacking and coupling step includes a stacking and welding step stacking and welding the flexures to the semi-stacked set to form the stacked set; and
said stacking and welding step includes stacking the flexures on the semi-stacked set at predetermined positions, positioning the respective flexures to the semi-stacked set using positioning tabs, and welding the stacked flexures to the semi-stacked set to form the stacked set.

10. The method of manufacturing a head suspension of claim 9, further comprising:
a first cutting step cutting a half of a frame coupled to the rigid parts forming a part of the rigid part chain product from the stacked set and the positioning tabs of respective ones of the flexures.

11. The method of manufacturing a head suspension of claim 10, further comprising:
a second cutting step cutting to obtain individual ones of said head suspension as final products from a remaining half of the stacked set.

* * * * *